US012718588B2

(12) United States Patent
Kazami et al.

(10) Patent No.: US 12,718,588 B2
(45) Date of Patent: Aug. 25, 2026

(54) PASSING DETERMINATION DEVICE, PASSING DETERMINATION SYSTEM, AND PASSING DETERMINATION METHOD

(71) Applicant: PANASONIC INTELLECTUAL PROPERTY MANAGEMENT CO., LTD., Osaka (JP)

(72) Inventors: Fukino Kazami, Tokyo (JP); Takaaki Idera, Kanagawa (JP); Yutaka Ikeda, Kanagawa (JP); Takefumi Takagi, Kanagawa (JP); Takeshi Ito, Kanagawa (JP); Kei Takamatsu, Kanagawa (JP); Akira Hagihara, Kanagawa (JP); Kazuki Kitada, Kanagawa (JP); Hiroki Teshima, Kanagawa (JP); Takaaki Moriyama, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 17 days.

(21) Appl. No.: 18/904,882

(22) Filed: Oct. 2, 2024

(65) Prior Publication Data

US 2025/0118086 A1 Apr. 10, 2025

(30) Foreign Application Priority Data

Oct. 4, 2023 (JP) ................................ 2023-172896

(51) Int. Cl.
*G06V 20/58* (2022.01)
*B60W 40/10* (2012.01)

(52) U.S. Cl.
CPC ............. *G06V 20/58* (2022.01); *B60W 40/10* (2013.01); *B60W 2300/14* (2013.01); *B60W 2554/4041* (2020.02)

(58) Field of Classification Search
CPC ...... G06V 20/58; G06V 20/63; G06V 20/625; G06V 30/1444; G06V 30/262;
(Continued)

(56) References Cited

U.S. PATENT DOCUMENTS

2005/0201592 A1* 9/2005 Peach .................... G06V 20/63
382/104
2016/0301864 A1* 10/2016 Petrany ..................... B60R 1/27

FOREIGN PATENT DOCUMENTS

JP 2020-030574 2/2020
JP 2020-513701 5/2020
(Continued)

OTHER PUBLICATIONS

International Search Report (ISR) from International Searching Authority (European Patent Office) in International Pat. Appl. No. PCT/JP2024/035317, dated Jan. 3, 2025.

*Primary Examiner* — Omar Casillashernandez
(74) *Attorney, Agent, or Firm* — Greenblum & Bernstein, P.L.C.

(57) ABSTRACT

A passing determination device acquires a first captured image obtained by repeatedly capturing an image of a region including a passing determination position of a trailer from a front of the trailer in a traveling direction of the trailer, and detects the trailer from the first captured image. Further, the passing determination device includes a processor configured to determine that the trailer detected from the first captured image captured at a first time passes through the passing determination position when the trailer is detected from the first captured image captured at the first time and the trailer is not detected from the first captured image captured within a first time period from the first time.

11 Claims, 16 Drawing Sheets

(58) Field of Classification Search
CPC .. G06V 20/54; B60W 40/10; B60W 2300/14; B60W 2554/4041; G08G 1/017; G08G 1/04; G06T 7/246
USPC .......................................................... 340/431
See application file for complete search history.

(56) References Cited

FOREIGN PATENT DOCUMENTS

| | | |
|---|---|---|
| JP | 2020-154959 | 9/2020 |
| KR | 102019036 | * 10/2019 |

* cited by examiner

FIG. 4

| ATTRIBUTE | TRAILER ID | OTHER THAN TRAILER ID |
| --- | --- | --- |
| WRITING MANNER OF CHARACTERS | ☆ VERTICAL WRITING<br>SAME SIZE, EQUAL INTERVALS, SINGLE COLOR, AND GOTHIC FONT<br>CHARACTERS ARE WRITTEN IN RECTANGLE<br>SIZE LARGER THAN PREDETERMINED SIZE<br>PREDETERMINED MAGNIFICATION WITH RESPECT TO TRAILER | DECORATIVE FONT<br>ITALIC |
| POSITION OF CHARACTER STRING | IN TRAILER<br>ABOVE LICENSE PLATE<br>WRITING IN VERTICAL WRITING IN CORNER OF TRAILER | WRITING IN TRACTOR<br>ABOVE OR BELOW COMPANY LOGO |
| CONTENT INDICATED BY CHARACTER STRING | INCLUDING ONLY CAPITAL LETTERS AND NUMBERS<br>NUMBER OF CHARACTERS IS WITHIN PREDETERMINED RANGE<br>SPECIFIC RULE FOR EACH COMPANY | ☆ CONTAINER ID<br>◎ CHARACTERS INDICATING HEIGHT OF TRAILER<br>◎ GENERIC NAME<br>◎ COMPANY NAME<br>◎ TELEPHONE NUMBER<br>◎ LICENSE PLATE<br>◎ TIME STAMP |

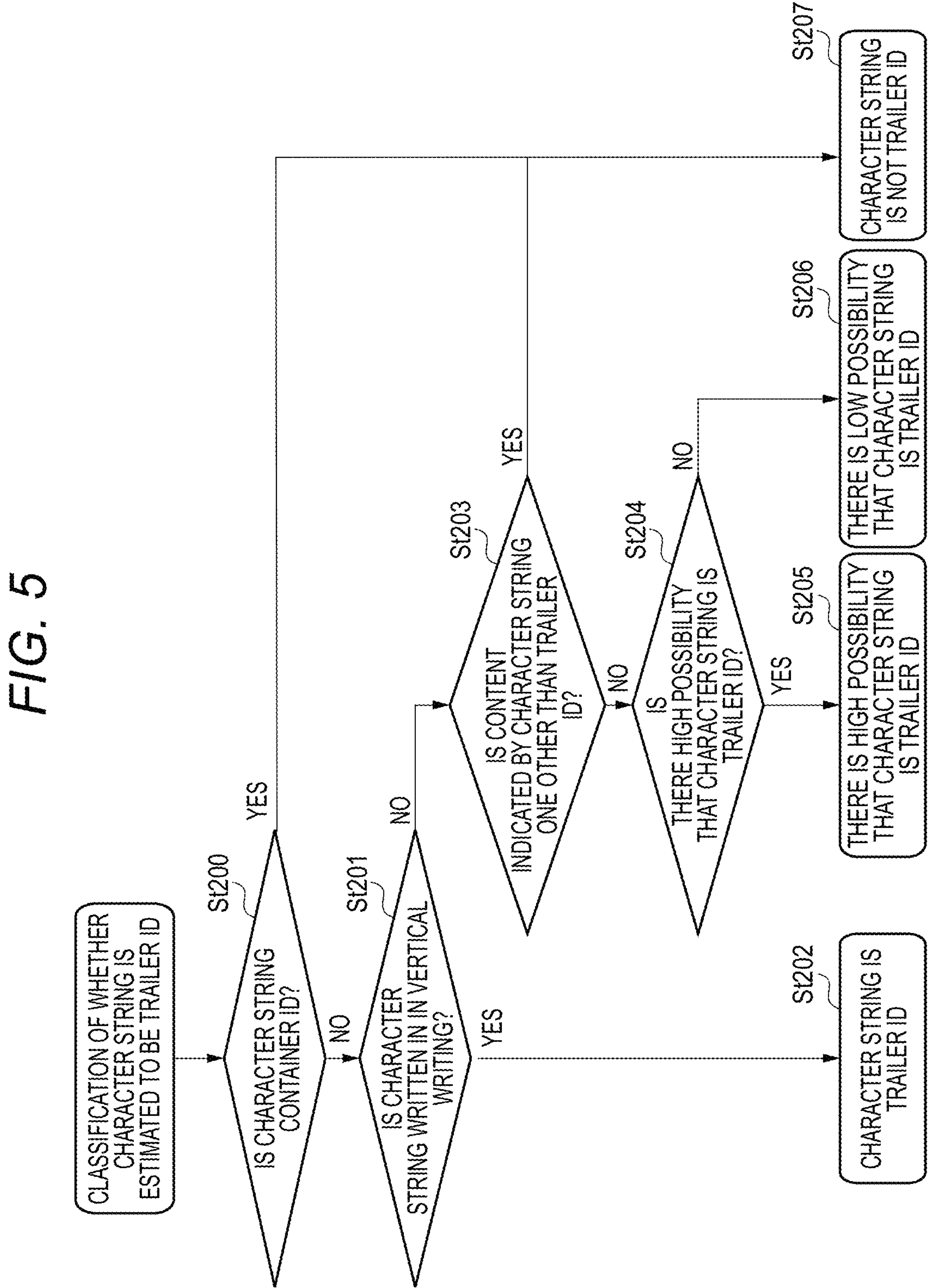
FIG. 5
CLASSIFICATION OF WHETHER CHARACTER STRING IS ESTIMATED TO BE TRAILER ID
St200
IS CHARACTER STRING CONTAINER ID?
YES
NO
St201
IS CHARACTER STRING WRITTEN IN IN VERTICAL WRITING?
YES
NO
St202
CHARACTER STRING IS TRAILER ID
St203
IS CONTENT INDICATED BY CHARACTER STRING ONE OTHER THAN TRAILER ID?
YES
NO
St204
IS THERE HIGH POSSIBILITY THAT CHARACTER STRING IS TRAILER ID?
YES
NO
St205
THERE IS HIGH POSSIBILITY THAT CHARACTER STRING IS TRAILER ID
St206
THERE IS LOW POSSIBILITY THAT CHARACTER STRING IS TRAILER ID
St207
CHARACTER STRING IS NOT TRAILER ID 2
FRONT CAMERA
CA1
REAR CAMERA
CA2
DATABASE
20A
DISPLAY DEVICE
30A
50
PASSING DETERMINATION DEVICE
COMMUNICATION I/F
42
51
PROCESSOR
MEMORY
43
CHARACTER STRING DETECTION UNIT
41A
CHARACTER STRING RECOGNITION UNIT
41B
ATTRIBUTE DETERMINATION UNIT
41C
TRAILER ID ESTIMATION UNIT
41D
TRACTOR DETECTION UNIT
41E
PASSING DETERMINATION UNIT
41F
DATABASE UPDATE UNIT
41G

FIG. 12

| TIME | T26 | T27 | T28 | T29 | T30 | T31 | T32 | T33 | T34 | T35 |
|---|---|---|---|---|---|---|---|---|---|---|
| FRONT CAMERA (FIRST CAPTURED IMAGE) | E | E | E | | | | | | | |
| REAR CAMERA (SECOND CAPTURED IMAGE) | | | | | | | | | F | F |

PASSING DETERMINATION DEVICE, PASSING DETERMINATION SYSTEM, AND PASSING DETERMINATION METHOD

TECHNICAL FIELD

The present disclosure is related to a passing determination device, a passing determination system, and a passing determination method.

BACKGROUND ART

Patent Literature 1 discloses an identical vehicle determination device that does not require calibration for adjusting an installation distance between a front camera and a rear camera by performing accurate relative position measurement. The identical vehicle determination device includes a detection distance estimation unit that estimates a detection distance between the front camera and the rear camera based on a speed and a passing time of a vehicle with a matching number calculated by a vehicle speed calculation unit. The identical vehicle determination device further includes an identical vehicle determination unit that, when numbers of a front license plate recognized by a first recognition unit and numbers of a rear license plate recognized by a second recognition unit do not match, calculates an assumed passing time of the vehicle based on the speed of the vehicle calculated by the vehicle speed calculation unit and the detection distance between the front camera and the rear camera estimated by the detection distance estimation unit. The identical vehicle determination unit determines that the numbers of the rear license plate recognized by the second recognition unit within the assumed passing time are the numbers of the rear license plate of the vehicle.

CITATION LIST

Patent Literature

Patent Literature 1: JP2020-154959A

SUMMARY OF INVENTION

In recent years, a physical distribution using a trailer has flourished, and there is an increasing need to efficiently manage a location of each trailer. Here, the trailer means a towed vehicle towed by a towing vehicle (also referred to as a tractor). A plurality of trailers may gather at a terminal or the like present in a warehouse or various places (for example, a departure point, a destination point, or a transit point). As an example of a point at which the trailers gather, a distribution center that loads packages to each delivery destination to a trailer, a trailer station that is used as a temporary storage place for trailers, or the like is considered. Hereinafter, the distribution center will be described as an example, and the point at which the trailers gather may be other facilities such as a trailer station. A very large number of trailers gather in the distribution center, and thus there is a need to automatically manage the trailers entering and exiting the distribution center.

In Patent Literature 1, the identical vehicle determination device determines that the vehicles captured by the front camera and the rear camera are the same vehicle when the numbers of the front license plate of the vehicle read by the front camera match the numbers of the rear license plate of the vehicle read by the rear camera. However, when a plurality of vehicles travel in close proximity, there is a possibility that a separation between the vehicles is not determined and the plurality of vehicles are erroneously determined to be one vehicle.

The present disclosure has been made in view of the above situation in the related art, and an object thereof is to distinguish trailers that travel in close proximity with high accuracy.

The present disclosure provides a passing determination device including a processor configured to acquire a first captured image obtained by repeatedly capturing an image of a region including a passing determination position of a trailer from a front of the trailer in a traveling direction of the trailer, detect the trailer from the first captured image, and determine that the trailer detected from the first captured image captured at a first time passes through the passing determination position when the trailer is detected from the first captured image captured at the first time and the trailer is not detected from the first captured image captured within a first time period from the first time.

The present disclosure provides a passing determination system including a front camera that repeatedly captures an image of a region including a passing determination position of a trailer from the front in a traveling direction of the trailer, and a processor that acquires a first captured image from the front camera. The processor is configured to detect the trailer from the first captured image, and determine that the trailer detected from the first captured image captured at a first time passes through the passing determination position when the trailer is detected from the first captured image captured at the first time and the trailer is not detected from the first captured image captured within a first time period from the first time.

The present disclosure provides a passing determination method including acquiring a first captured image obtained by repeatedly capturing an image of a region including a passing determination position of a trailer from the front in a traveling direction of the trailer; detecting the trailer from the first captured image; and determining that the trailer detected from the first captured image captured at a first time passes through the passing determination position when the trailer is detected from the first captured image captured at the first time and the trailer is not detected from the first captured image captured within a first time period from the first time.

The present disclosure provides a passing determination device a processor configured to acquire a captured image at a predetermined time interval from a camera configured to capture an image of a trailer, set a coordinate in a direction corresponding to a traveling direction of the trailer in the captured image, calculate a first coordinate of the trailer, and determine that the trailer passes through a passing determination position when an amount of change between the calculated first coordinate and a second coordinate of the trailer calculated from the captured image acquired immediately before is equal to or greater than a predetermined threshold value.

The present disclosure provides a passing determination system including a camera that captures an image of a trailer, and a processor that captures a captured image from the camera. The processor is configured to acquire the captured image at a predetermined time interval from the camera, set a coordinate in parallel to a traveling direction of the trailer in the captured image, calculate a first coordinate of the trailer, and determine that the trailer passes through a passing determination position when an amount of change between the calculated first coordinate and a second coordinate of the trailer calculated from the captured image acquired immediately before is equal to or greater than a predetermined threshold value.

The present disclosure provides a passing determination method including acquiring a captured image at a predetermined time interval from a camera configured to capture an image of a trailer; setting a coordinate in parallel to a traveling direction of the trailer in the captured image; calculating a first coordinate of the trailer; and determining that the trailer passes through a passing determination position when an amount of change between the calculated first coordinate and a second coordinate of the trailer calculated from the captured image acquired immediately before is equal to or greater than a predetermined threshold value.

These comprehensive or specific aspects may be implemented by a system, a device, a method, an integrated circuit, a computer program, or a recording medium, and may be implemented by any combination of the system, the device, the method, the integrated circuit, the computer program, and the recording medium.

According to the present disclosure, it is possible to distinguish the trailers that travel in close proximity with high accuracy.

BRIEF DESCRIPTION OF DRAWINGS

FIG. 4 is a diagram showing attributes for estimation as a trailer ID and attributes for estimation not as the trailer ID;

FIG. 5 is a flowchart of a classification of whether a character string is estimated to be a trailer ID;

FIG. 12 is a diagram showing a second case in which no trailer is detected for a second time period or longer;

FIG. 14 is a diagram showing an example of time-series data of captured images of two trailers that travel in close proximity;

DESCRIPTION OF EMBODIMENTS

Figure 1:
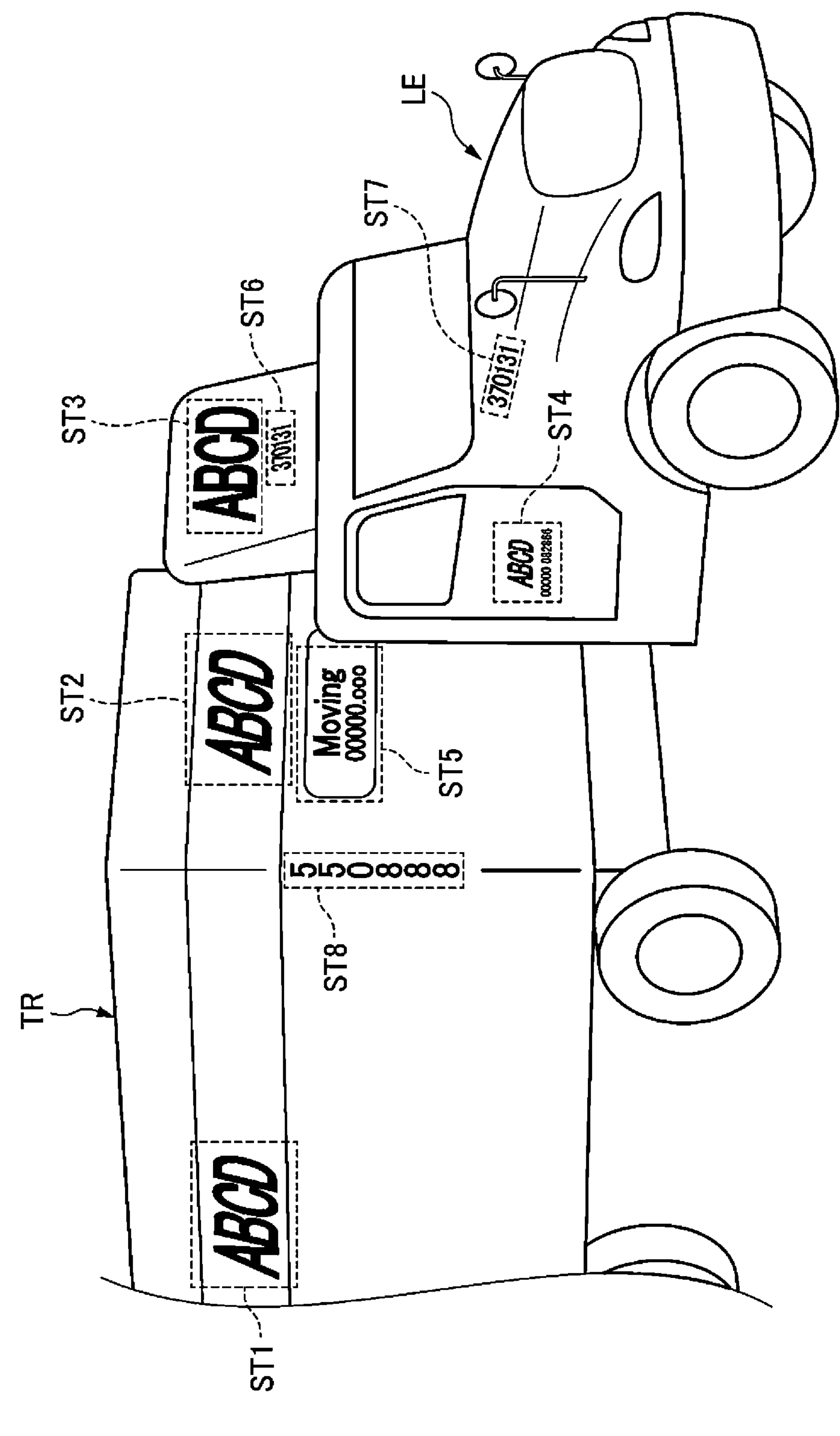
FIG. 1 is a diagram showing character strings written on a trailer.

Hereinafter, embodiments that specifically disclose a passing determination device, a passing determination system, and a passing determination method according to the present disclosure will be described in detail with reference to the drawings as appropriate. However, the unnecessarily detailed description may be omitted. For example, the detailed description of already well-known matters and the repeated description of substantially the same configuration may be omitted. This is to avoid unnecessary redundancy of the following description and to facilitate understanding of those skilled in the art. The accompanying drawings and the following description are provided for those skilled in the art to fully understand the present disclosure, and are not intended to limit the subject matter described in the claims.

Background of First Embodiment

Patent Literature 2 (JP2008-217347A) discloses a license plate recognition device that detects a plurality of quadrangles of license plate region candidates from an input image and executes character recognition of character regions included in the license plate region candidates. The license plate recognition device selects a license plate region candidate to be output from the plurality of detected license plate region candidates, based on character recognition results and information on the quadrangles of the license plate region candidates. The license plate recognition device outputs information on the selected license plate region candidate.

In recent years, a physical distribution using a trailer has flourished, and there is an increasing need to efficiently manage a location of each trailer. Here, the trailer means a towed vehicle towed by a towing vehicle (also referred to as a tractor). The trailer may load a container that stores various articles or the like. Since a trailer or a container generally has an identification (Hereinafter, referred to as "ID") related to identification of the trailer or the container, it is considered that the trailer or the container can be efficiently managed by recognizing this ID from a captured image of a vehicle or the like. However, the captured image may include various characters, and a character string successfully recognized is not necessarily the ID related to the identification of the trailer or the container. Therefore, when a trailer or a container which is an object to be imaged includes a plurality of character strings having various sizes, colors, and designs, there is a need to detect an ID related to identification of the trailer or the container from the plurality of character strings and identify the object to be imaged. Hereinafter, the ID related to the identification of the trailer is referred to as a "trailer ID", and the ID related to the identification of the container is referred to as a "container ID".

In Patent Literature 2, a quadrangle that satisfies a predetermined condition is determined as a quadrangle of the license plate region candidate. However, since no unified standard is defined for the trailer ID at present, a position, a size, the number of characters, or the like are not defined. Therefore, even if the same technique as in Patent Literature 1 is applied, it is difficult to detect the trailer ID from various character strings written at any positions of the object to be imaged. In addition, there are a plurality of standards for the container ID, and it is difficult to detect the container ID from various character strings as in the trailer ID.

Therefore, in the following first embodiment, an example of a character recognition device and a character recognition method for detecting a character string considered to be a trailer ID or a container ID from a plurality of character strings will be described.

First Embodiment

Character strings written on a trailer TR will be described with reference to FIG. 1. FIG. 1 is a diagram showing the character strings written on the trailer TR.

The trailer TR is an entire object towed by a tractor LE. Generally, a vehicle towed by a tractor is called a trailer. The trailer may include a set of a container that stores a cargo but does not have a mechanism for the movement such as wheels, and a carriage that loads the container. In addition, the trailer may be implemented by a vehicle in which a portion that stores a cargo and a mechanism for the movement are integrated with each other. When the tractor LE tows the set of the container and the carriage, only the carriage may be called a trailer. However, in the present specification, for convenience of description, both of the entire object to be towed by the tractor LE, that is, the set of the carriage and the container, and the vehicle including the portion that stores the cargo and the mechanism for the movement will be referred to as the trailer. On the trailer TR, a trailer ID, and character strings related to a company name, a telephone number, a number indicating a height of the trailer, a uniform resource locator (Hereinafter, referred to as "URL"), a word, a text, or the like are written. The character strings written on the trailer TR are not limited to the above examples.

Character strings ST1, ST2, ST3, and ST4 are character strings indicating a company name. The character strings ST1, ST2, ST3, and ST4 are character strings subjected to italic character decoration.

A character string ST5 is a character string indicated by an English word and is written below the character string ST2 indicating the company name.

Character strings ST6 and ST7 are character strings related to numbers for identifying the tractor LE.

A character string ST8 is a character string indicating the trailer ID. The character string ST8 is written in vertical writing in a corner of the trailer TR (that is, a boundary portion of surfaces of the trailer TR forming a housing, and a portion which is located on a side surface of the trailer TR and is elongated in a gravity direction).

As described above, a plurality of character strings are written on the trailer TR.

In recent years, as a physical distribution industry has flourished, there is an increasing need to efficiently manage a large number of trailers TR. For example, it is necessary to identify each trailer TR at a place at which a plurality of trailers TR gather. However, since the trailer TR has the plurality of character strings (for example, character strings ST1, ST2, ST5, and ST8), there is a problem that it is difficult to detect the trailer ID from the plurality of character strings.

Figure 2:
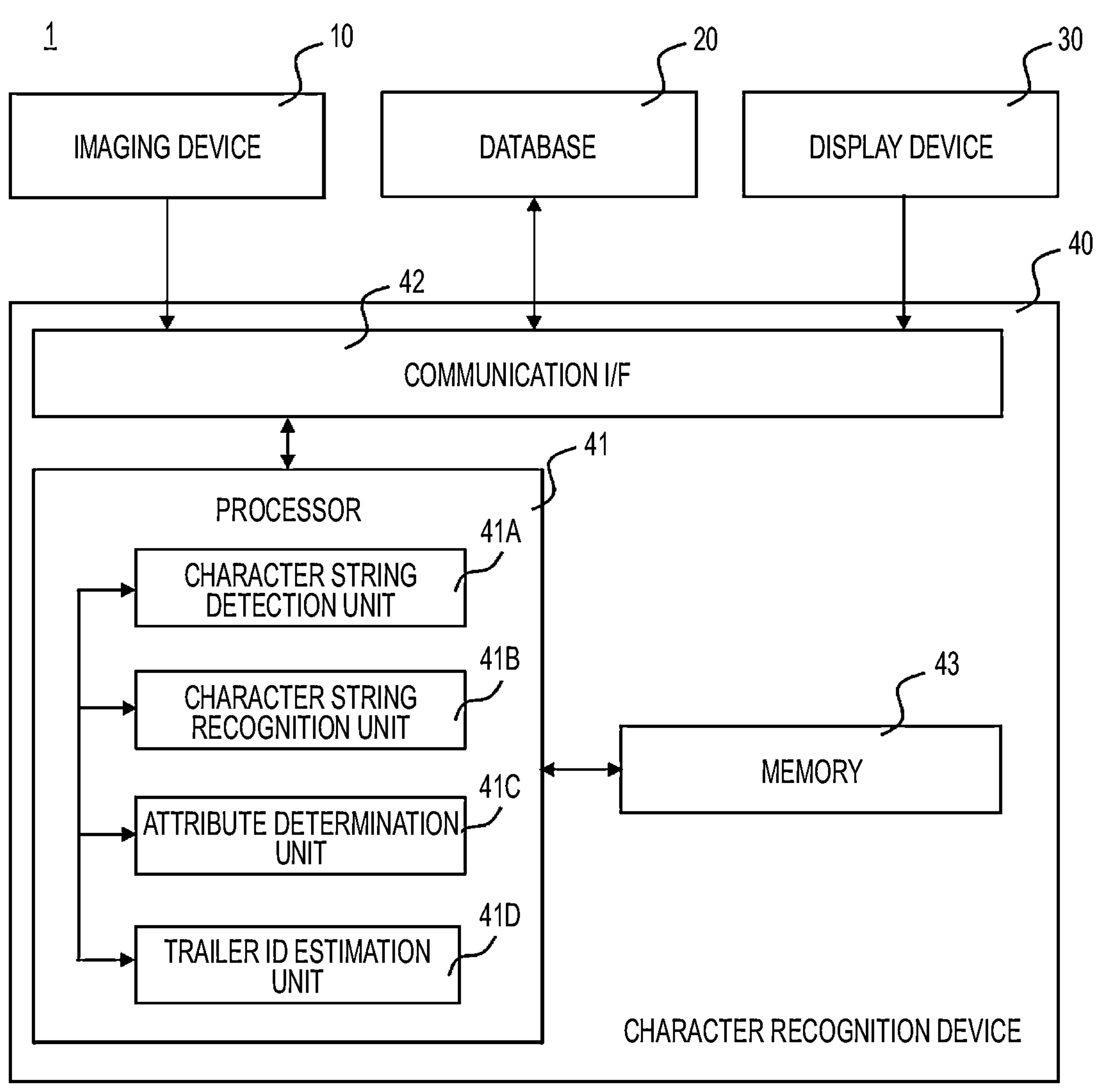
FIG. 2 is a block diagram of a character recognition system according to a first embodiment.

Next, a block diagram of a character recognition system 1 according to the first embodiment will be described with reference to FIG. 2. FIG. 2 is a block diagram of the character recognition system 1 according to the first embodiment.

The character recognition system 1 includes at least an imaging device 10, a database 20, a display device 30, and a character recognition device 40.

The imaging device 10 is a device that captures an image of a trailer. The imaging device 10 includes at least a lens (not shown) as an optical element and an image sensor (not shown). The lens receives light reflected from an object within an angle of view of a region imaged by the imaging device 10 to form an optical image of the object on a light receiving surface (in other words, an imaging surface) of the image sensor. The image sensor is, for example, a solid-state imaging element such as a charged coupled device (Hereinafter, referred to as "CCD") or a complementary metal oxide semiconductor (Hereinafter, referred to as "CMOS"). The image sensor converts the optical image formed on the imaging surface via the lens into an electric signal at every predetermined time (for example, 1/30 (second)). For example, when the predetermined time is 1/30 (second), a frame rate of the imaging device 10 is 30 fps. The imaging device 10 may generate image data (video data) by performing predetermined signal processing on the electric signal at every predetermined time described above. The image data is a still image, and the video data is a moving image. The imaging device 10 outputs the image data (video data) to the character recognition device 40. Hereinafter, the image data and the video data are referred to as captured images.

The database 20 is implemented by a storage medium (for example, a flash memory, a hard disk drive (Hereinafter, referred to as "HDD"), and a solid state drive (Hereinafter, referred to as "SSD")). The database 20 stores a table (Hereinafter, referred to as a classification table, see FIG. 4) for classifying whether an attribute of a character string is for estimation as a trailer ID. The database 20 is written with a result of determination as to whether the character string is the trailer ID executed by the character recognition device 40. The database 20 may be incorporated into the character recognition device 40.

The display device 30 displays the result of the determination as to whether the character string is the trailer ID executed by the character recognition device 40. The display device 30 is, for example, a touch panel display, a display, or a mobile phone. The display device 30 may be integrated with the character recognition device 40.

The character recognition device 40 includes at least a processor 41, a communication I/F 42, and a memory 43. The character recognition device 40 is, for example, a personal computer (Hereinafter, referred to as "PC").

The processor 41 is, for example, a central processing unit (Hereinafter, referred to as "CPU"), a digital signal processor (Hereinafter, referred to as "DSP"), a graphical processing unit (Hereinafter, referred to as "GPU"), or a field programmable gate array (Hereinafter, referred to as "FPGA"). The processor 41 functions as a controller that controls the overall operation of the character recognition device 40. The processor 41 performs control processing for controlling operations of respective units of the character recognition device 40, data input and output processing with each of the units of the character recognition device 40, data calculation processing, and data storage processing. The processor 41 operates according to a program stored in the memory 43. The processor 41 uses the memory 43 during operation and temporarily stores data generated or acquired by the processor 41 in the memory 43. The processor 41 implements respective functions of a character string detection unit 41A, a character string recognition unit 41B, an attribute determination unit 41C, and a trailer ID estimation unit 41D by using the program and the data stored in the memory 43.

The character string detection unit 41A as an example of a detection unit detects character strings from a captured image acquired from the imaging device 10. The character string detection unit 41A detects the character strings using a known technique such as machine learning.

The character string recognition unit 41B as an example of a recognition unit performs character recognition of the character strings detected by the character string detection unit 41A. The character string recognition unit 41B performs the character recognition of the character strings using a known technique such as optical character recognition (Hereinafter, referred to as "OCR").

The attribute determination unit 41C as an example of a determination unit determines an attribute of each character string recognized by the character string detection unit 41A. The attribute is, for example, a writing manner of characters, a position of a character string, or a content indicated by a character string. The attribute will be described later.

The trailer ID estimation unit 41D as an example of a determination unit estimates whether the detected and recognized character string is a trailer ID based on the attribute. The trailer ID estimation unit 41D calculates, as a score, a level of a possibility that the character string is the trailer ID based on the attribute. The trailer ID estimation unit 41D classifies the character strings into one estimated to be a trailer ID, one estimated not to be the trailer ID, one having a high possibility of being the trailer ID based on the calculated score, and one having a low possibility of being the trailer ID based on the calculated score. The trailer ID estimation unit 41D sorts (that is, rearranges) the classified character strings in an order (for example, a descending order of score) in which a possibility of being the trailer ID is considered to be high. The trailer ID estimation unit 41D outputs an estimation result, and a classification result or a sorting result of the character strings to the communication I/F 42.

The communication I/F 42 is an interface circuit that performs wireless or wired communication between the character recognition device 40 and the imaging device 10, between the character recognition device 40 and the database 20, and between the character recognition device 40 and the display device 30. Here, I/F represents an interface. The communication between the character recognition device 40 and the imaging device 10, between the character recognition device 40 and the database 20, and between the character recognition device 40 and the display device 30 may be performed via a network. Examples of a communication method performed by the communication I/F 42 include mobile communication such as a wide area network (Hereinafter, referred to as "WAN"), a local area network (Hereinafter, referred to as "LAN"), a long term evolution (Hereinafter, referred to as "LTE"), 4G, and 5G, power line communication, short-range wireless communication (for example, Bluetooth (registered trademark) communication), or communication for a mobile phone.

The memory 43 includes, for example, a random access memory (Hereinafter, referred to as "RAM") and a read only memory (Hereinafter, referred to as "ROM"), and temporarily holds a program necessary for the operation of the character recognition device 40 and data generated during the operation. The RAM is, for example, a work memory used during the operation of the character recognition device 40. The ROM stores and holds in advance, for example, a program for controlling the character recognition device 40.

Figure 3:
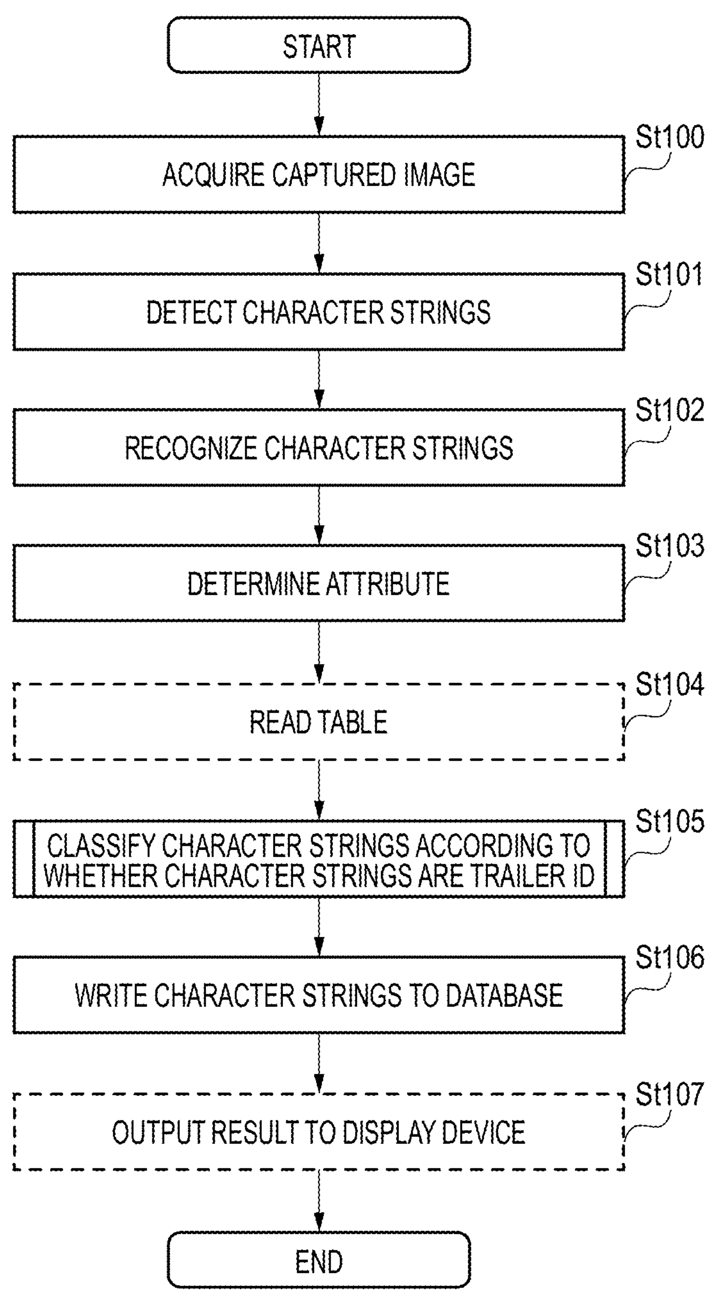
FIG. 3 is a flowchart of processing executed by a character recognition device.

Next, a flowchart of processing executed by the character recognition device 40 will be described with reference to FIG. 3. FIG. 3 is the flowchart of the processing executed by the character recognition device 40. Each processing in the flowchart according to FIG. 3 is executed by the processor 41.

The processor 41 acquires a captured image from the imaging device 10 (step St100).

The processor 41 detects character strings from the captured image acquired in the processing of step St100 (step St101).

The processor 41 performs character recognition of the character strings detected in the processing of step St101 (step St102).

The processor 41 determines an attribute of each character string recognized in the processing of step St102 (step St103).

The processor 41 reads the classification table stored in the database 20 (step St104). The processing of step St104 may be omitted.

The processor 41 estimates whether the character string is a trailer ID based on the attribute determined in the processing of step St103. The processor 41 estimates whether each of a plurality of character strings detected in the processing of step St101 is the trailer ID, and classifies the character strings into a character string estimated to be the trailer ID and a character string estimated not to be the trailer ID (step St105). The processing of step St105 will be described in detail with reference to FIG. 5.

The processor 41 outputs and writes the character strings classified in the processing of step St105 to the database 20 (step St106).

The processor 41 outputs a result of step St105 to the display device 30 (step St107). The processing of step St107 may be omitted.

Next, attributes for estimation as a trailer ID and attributes for estimation not as the trailer ID will be described with reference to FIG. 4. FIG. 4 is a diagram showing the attributes for estimation as the trailer ID and the attributes for estimation not as the trailer ID.

The classification table shown in FIG. 4 is a table for classifying whether each attribute is the attribute for estimation as the trailer ID or the attribute for estimation not as the trailer ID.

A description will be given of whether each attribute related to a "writing manner of characters" is for estimation as the trailer ID or not as the trailer ID.

A vertical writing of a character string is one of the attributes for estimation as the trailer ID. In general, there is a low possibility that information on a company name, a telephone number, a URL, and the like is written in vertical writing, and characters on a license plate are also defined to be written in horizontal writing. Therefore, there is a low possibility that characters other than the trailer ID are written in vertical writing, and thus there is a high possibility that the character string written in vertical writing is the trailer ID.

The expression that characters included in a character string have the same size, equal intervals, a single color, or gothic font is one of the attributes for estimating that the character string is the trailer ID. Since the trailer ID is less likely to be used for an advertising purpose due to a nature thereof, a special design or the like is less likely to be adopted in the trailer ID, and the trailer ID is often written in a simple form. Therefore, the expression that the character string is written in a simple form as described above may be a basis for estimating that the character string is the trailer ID.

The expression that a character string is written in a rectangle is one of the attributes for estimation as the trailer ID. When a color of the trailer and a color of the trailer ID are similar to each other, a measure may be taken to improve visibility. The measure may include drawing a rectangle of a color different from a color of the character string as a background of the trailer ID. Therefore, the expression that a character string is written in a rectangle may be a basis for estimating that the character string is the trailer ID. In addition, other measures such as edging of characters are conceivable, but the measures are less likely to be adopted for the trailer ID, because, for the trailer ID, the visibility is more important than the design.

The expression that a character string has a size larger than a predetermined size determined in advance by a user (for example, a person who manages the character recognition device 40) is one of the attributes for estimation as the trailer ID. This is because the trailer ID is often written in a large size with an emphasis on visibility.

The expression that a character string has a predetermined magnification with respect to the trailer is one of the attributes for estimation as the trailer ID. This is because the trailer ID is often written in a large size with an emphasis on visibility.

The expression that a character string is of a decorative font or an italic font is one of the attributes for estimation not as the trailer ID. This is because the trailer ID is a character string written to make the ID itself visually recognizable, and thus it is not necessary to make a typeface or the like more complicated than necessary.

Next, a description will be given of whether each attribute related to a "position of a character string" is for estimation as the trailer ID or not as the trailer ID.

The expression that a character string is located above the license plate is one of the attributes for estimation as the trailer ID. This is because the trailer ID is less likely to be written at a position lower than the license plate, which is generally disposed at a lower portion of a vehicle body. Since various methods for detecting a position of a license plate are known, the details thereof are omitted.

The expression that a character string is written in vertical writing at a corner of the trailer is one of the attributes for estimation as the trailer ID. Since the corner of the trailer is a place that is less likely to be visually recognized unless a person is conscious of the corner, it is less likely to select the corner of the trailer as a position to write information to be publicly disclosed, such as a company name or a telephone number. Therefore, there is a high possibility that the character string written at this place is a character string used for a special purpose by an operator, such as the trailer ID. As described above, there is a high possibility that the character string written in vertical writing is the trailer ID. In the present embodiment, writing the character string in vertical writing at the corner is an example of the attributes, but the expression that the character string is written at the corner regardless of a direction of the character string may be used as the attribute for estimation as the trailer ID. This is because the writing at the corner itself suggests that the character string is for a special purpose as described above.

The expression that a character string is written on the tractor LE is one of the attributes for estimation not as the trailer ID. This is because the trailer can be moved with replacing the tractor, and thus there is a low possibility that the trailer ID, which is a character string for identifying the trailer, is written on the tractor.

The expression that a character string is written above or below a company logo, a mark, or a character string is one of the attributes for estimation not as the trailer ID. This is because a character string written around the company logo or the like is highly likely to be information to be publicly disclosed, such as a telephone number or an advertisement phrase, and is less likely to be written as information for the operator, such as the trailer ID.

Next, a description will be given of whether each attribute related to a "content indicated by a character string" is for estimation as the trailer ID or not as the trailer ID.

The expression that a character string includes only capital letters and numbers is one of the attributes for estimation as the trailer ID. This is because when a character string that includes easily confused characters such as capital letters and small letters is used as an ID, a plurality of different IDs having the same pronunciation are present, which causes confusion, and thus it is general to limit a type of characters used as an ID. The capital letters are often adopted from the viewpoint of visibility between the capital letters and the small letters, and the numbers are also generally used in combination in order to generate more IDs, and thus the expression that the character string includes only the capital letters and the numbers may be a basis for estimation as the trailer ID. In the first embodiment, the expression that the character string includes only the capital letters and the numbers is one of the attributes for estimation as the trailer ID, but when it is known that a character string including only one type of capital letters, small letters, or numbers tends to be used as the trailer ID, the expression that a character string includes a character type thereof may be one of the attributes for estimation as the trailer ID. In addition, the expression that a character string does not include a character type used only in some limited languages, such as Chinese characters and Hangul, may be one of the attributes for estimation as the trailer ID. This is because there is a low possibility that characters that can be read only in a limited number of languages are used as a trailer ID particularly when global transportation is performed.

The expression that the number of characters is within a predetermined range defined in advance by the user is one of the attributes for estimation as the trailer ID. This is because the number of characters constituting the trailer ID is often a limited number of characters, unlike a sentence or the like.

The expression that a character string conforms to a specific rule for each company is one of the attributes for estimation as the trailer ID. This is because when a rule for each company is known, there is a high possibility that a character string matching the rule is the trailer ID.

The expression that a character string is a container ID is one of the attributes for estimation not as the trailer ID. The container ID is a code that is written according to a predetermined specification and is used for managing and identifying a container. In the first embodiment, the container ID is assumed to be an international standard code defined by ISO6346. The container ID is an ID used for managing a container, and is a character string in which a unified standard is regulated between operators. When a trailer ID that matches this standard is adopted as a trailer ID used by the operators, there is a problem in the management of containers between the operators, and thus there is a low possibility that a form that matches the container ID standard is adopted as a form of the trailer ID. Therefore, the expression that the character string is the container ID may be a basis for estimation not as the trailer ID.

The expression that a character string indicates a height of the trailer is one of the attributes for estimation not as the trailer ID. Whether the character string indicates the height of the trailer can be determined based on the presence or absence of characters indicating a unit, the number of digits of a numerical value, and the like. In addition, when there is a possibility that a character string or the like indicating a height of one other than the trailer (for example, a height of the tractor) is written, the expression that the character string indicates the height of the tractor may be used as the attribute for estimation not as the trailer ID.

The expression that a character string is a generic name is one of the attributes for estimation not as the trailer ID. This is because the trailer ID is often constituted as a meaningless character string in order to prevent confusion with other character strings.

The expression that a character string is a company name is one of the attributes for estimation not as the trailer ID. This is because the trailer ID is often constituted as a meaningless character string in order to prevent confusion with other character strings. Whether the character string is the company name can be estimated by, for example, comparing the recognized character string with a database of company names. In order to ensure a uniqueness of the trailer ID, a company name may be included as a part of the trailer ID. Therefore, when it is known in advance that the trailer ID including the company name is present, the expression that the character string is the company name may be excluded from the attributes for estimation not as the trailer ID.

The expression that a character string is a telephone number is one of the attributes for estimation not as the trailer ID. Whether the character string is the telephone number can be estimated by comparing the number of digits of the recognized character string, a format such as the presence or absence of a hyphen, or a content of the character string with a database of telephone numbers.

The expression that a character string is a license plate is one of the attributes for estimation not as the trailer ID. This is because a character string that may be written on a license plate is often regulated by law or the like, and there is a low possibility that the trailer ID is written on the license plate.

The expression that a character string is a time stamp related to a date and time or the like written in a captured image is one of the attributes for estimation not as the trailer ID.

The attributes each marked with a star mark shown in FIG. 4 (the expression that the character string is written in vertical writing, and the expression that the character string is the container ID) are attributes that are preferentially determined over the other attributes when it is estimated whether a character string is the trailer ID. The preferentially determined attributes may be attributes having a higher possibility of identifying the trailer ID with high probability than the other attributes or a combination of the attributes. In the first embodiment, the reason for using the expression that the character string is written in vertical writing and the expression that the character string is the container ID as the preferentially determined attributes is as follows. First, a character string written in a container is often written in horizontal writing, and there is a low possibility that a character string written in vertical writing is a character string indicating a company name or the like. Therefore, a character string having a low possibility of being a trailer ID can be excluded by selecting the character string written in vertical writing. However, since it is known that the container ID may be written in vertical writing, the container ID may not be completely excluded only by selecting a character string written in vertical writing. However, since the container ID needs to be written in a form defined in the standard, it is possible to reliably determine whether the character string is the container ID based on whether the character string matches the form. That is, a character string which is written in vertical writing and is not the container ID can be estimated to be the trailer ID with high probability.

The attributes each marked with a double circle shown in FIG. 4 (the expression that the character string indicates the height of the trailer, and the expression that the character string is the generic name, the company name, the telephone number, the license plate, or the time stamp) are attributes for determination not as the trailer ID when the character string matches one of the attributes.

Next, processing of the classification of whether a character string is estimated to be a trailer ID will be described with reference to FIG. 5. FIG. 5 is a flowchart of the classification of whether the character string is estimated to be the trailer ID. Each processing according to the flowchart of FIG. 5 is executed by the processor 41.

The processor 41 determines whether a character string is a container ID (step St200). When it is determined that the character string is the container ID (step St200, YES), the processor 41 determines that the character string is not a trailer ID (step St207).

When it is determined that the character string is not the container ID (step St200, NO), the processor 41 determines whether the character string is written in vertical writing (step St201).

When it is determined that the character string is written in vertical writing (step St201, YES), the processor 41 determines that the character string is the trailer ID (step St202).

When it is determined that the character string is not written in vertical writing (step St201, NO), the processor 41 determines whether a content indicated by the character string is one other than the trailer ID (step St203). That is, in the processing of step St203, the processor 41 determines whether the character string corresponds to the attributes each marked with the double circle in the table of FIG. 4.

When it is determined that the character string corresponds to one of the attributes each marked with the double circle in the table of FIG. 4 (that is, the character string is one other than the trailer ID) (step St203, YES), the processor 41 determines that the character string is not the trailer ID (step St207).

When it is determined that the character string does not correspond to one of the attributes each marked with the double circle in the table of FIG. 4 (that is, the character string is not the one other than the trailer ID) (step St203, NO), the processor 41 determines whether there is a high possibility that the character string is the trailer ID using attributes (Hereinafter, referred to as normal attributes) to which no symbol is marked in the table of FIG. 4 (step St204). The processor 41 calculates, for example, a level of the possibility that the character string is the trailer ID as a score. For example, the processor 41 adds the score when a character string corresponds to the normal attribute for estimation as the trailer ID, and subtracts the score when a character string corresponds to the normal attribute for estimation not as the trailer ID. A method of calculating a score is not limited to the above example, and the score may be calculated by combining addition, subtraction, and multiplication. The higher the score, the higher the possibility that the character string is the trailer ID. The processor 41 may sort character strings based on calculated scores (for example, arrange the character strings in a descending order of score).

When it is determined that there is a high possibility that the character string is the trailer ID by using the normal attributes (step St204, YES), the processor 41 classifies the character string into a character string having a high possibility of being the trailer ID (step St205). For example, when the calculated score is equal to or greater than a predetermined threshold value, the processor 41 determines that there is a high possibility that the character string is the trailer ID. In addition, the processor 41 may sort character strings determined to have a high possibility of being the trailer ID in order of score (that is, arrange the character strings in a descending order or an ascending order of score).

When it is determined that there is a low possibility that the character string is the trailer ID by using the normal attributes (step St204, NO), the processor 41 classifies the character string into a character string having a low possibility of being the trailer ID (step St206). For example, when the calculated score is less than the predetermined threshold value, the processor 41 determines that there is a low possibility that the character string is the trailer ID. In addition, the processor 41 may sort character strings determined to have a low possibility of being the trailer ID in order of score (that is, arrange the character strings in the descending order or the ascending order of score).

Other Modifications

The attributes for estimation as the trailer ID and the attributes for estimation not as the trailer ID in the above embodiment are examples, and the attributes for estimation as the trailer ID and the attributes for estimation not as the trailer ID may be adopted based on other conditions. In addition, the attributes for estimation as the trailer ID and the attributes for estimation not as the trailer ID may be reversed and used as attributes having equivalent meanings. For example, instead of using the expression that the character string is written in vertical writing as the attribute for estimation as the trailer ID, the expression that a character string is written in horizontal writing may be used as the attribute for estimation not as the trailer ID.

In the above embodiment, the expression that the character string is written in vertical writing and the expression that the character string is the container ID are exemplified as the attributes that are preferentially determined over the other attributes. However, any one attribute or the other attributes may be used as an the attributes to be judged attributes. As described above, when the character string is written in vertical writing and the character string is not the container ID, it can be said that the character string is the trailer ID with high probability. However, for example, when it is known that a character string written in vertical writing does not include the container ID, only the expression that the character string is written in vertical writing may be the preferentially determined attribute. In addition, for example, when it is known that the trailer ID is written in a special form, it is possible to recognize the trailer ID more efficiently by using the special form as the preferentially judged attributes.

In the above embodiment, the attributes for mainly recognizing the trailer ID have been described. However, the attributes used for recognizing the trailer ID are not limited to those described above. A similarity with a format of the character string known as the trailer ID may be used as an attribute. For example, the trailer ID is often configured as a character string in which numbers follow alphabetic characters, and thus the character recognition device 40 may determine that there is a high possibility that the character string matching the configuration is the trailer ID. The trailer ID tends to be written in a range of a certain number of characters, and thus the character recognition device 40 may use the number of characters of the character string as an attribute for determining whether the trailer ID is recognized.

When the trailer ID is configured only by numbers or is written by a notation or a character string similar to other known character strings, it may be difficult to recognize the trailer ID by the determination based on the attributes described above. In such a case, the character recognition device 40 may determine whether the recognized character string is the trailer ID based on a similarity between the recognized character string and a character string written as a correct trailer ID.

Furthermore, in the above embodiment, the configuration for recognizing the trailer ID has been described, and a similar configuration may be used as a configuration for recognizing a container ID. When the trailer TR is identified, a container ID can be used instead of the trailer ID, and thus when the trailer TR is managed, the trailer ID and the container ID may be handled without being distinguished from each other.

Summary of First Embodiment

The following techniques are disclosed by the above description of the first embodiment.

Technique 1

A character recognition device (for example, character recognition device 40) according to the first embodiment includes: a recognition unit (for example, character string recognition unit 41B) configured to recognize at least one character string from an image including a trailer captured by an imaging device (for example, imaging device 10); an attribute determination unit (for example, attribute determination unit 41C) configured to determine an attribute of the character string recognized by the recognition unit; and a trailer ID estimation unit (for example, trailer ID estimation unit 41D) configured to estimate whether the character string is a trailer ID based on the attribute of the character string determined by the attribute determination unit.

Accordingly, when a plurality of character strings are written at any positions in various sizes, fonts, or writing manners in the trailer, the character recognition device according to the first embodiment can detect a character string considered to be the trailer ID from the plurality of character strings. That is, the character recognition device can detect the trailer ID from the plurality of character strings written on the trailer with high accuracy.

Technique 2

In the character recognition device according to Technique 1, the trailer ID estimation unit estimates that the character string is the trailer ID when a writing manner of the character string is vertical writing and a content indicated by the character string is not a container ID according to a predetermined specification.

Accordingly, the character recognition device according to the first embodiment can reliably determine whether the character string is the container ID based on whether the character string matches a form defined by a predetermined standard. When the container ID is written in vertical writing, the character recognition device can estimate that the character string is not the trailer ID with high probability. That is, the character recognition device can exclude the container ID from the plurality of character strings with high probability and detect the character string considered to be the trailer ID with high accuracy.

Technique 3

In the character recognition device according to Technique 1 or 2, the trailer ID estimation unit estimates that the character string is the trailer ID when the writing manner of the character string is vertical writing and the content indicated by the character string is not a container ID specified by ISO6346.

Accordingly, the character recognition device according to the first embodiment can exclude the container ID from the plurality of character strings and detect the character string considered to be the trailer ID with high accuracy.

Technique 4

In the character recognition device according to any one of Techniques 1 to 3, the trailer ID estimation unit estimates that the character string is not the trailer ID when the writing manner of the character string is not vertical writing, and the content indicated by the character string is not the container ID and is one other than the trailer ID.

Accordingly, the character recognition device according to the first embodiment can exclude any character string that is written in horizontal writing and is not the container ID when a content indicated by the character string is one other than the trailer ID. That is, the character recognition device can prevent a character string indicating one other than the trailer ID from being erroneously detected as the trailer ID.

<Technique 5

In the character recognition device according to any one of Techniques 1 to 4, the character string indicating one other than the trailer ID indicates a height of the trailer, a generic name, a company name, a telephone number, a license plate, or a time embedded in the image captured by the imaging device.

Accordingly, the character recognition device according to the first embodiment can prevent the character string indicating one other than the trailer ID from being erroneously detected as the trailer ID.

Technique 6

In the character recognition device according to any one of Techniques 1 to 5, the trailer ID estimation unit estimates whether there is a high possibility of being the trailer ID based on at least one of an attribute related to a writing manner of a character, an attribute related to a position of the character string, and an attribute by which a content indicated by the character string is estimated to be the trailer ID, when the writing manner of the character string is not vertical writing, and the content indicated by the character string is not the container ID and is not one other than the trailer ID.

Accordingly, the character recognition device according to the first embodiment can classify the plurality of character strings written on the trailer with high accuracy according to whether there is a high possibility of being the trailer ID.

Technique 7

In the character recognition device according to any one of Techniques 1 to 6, the trailer ID estimation unit is configured to calculate, as a score, a level of a possibility that the character string is the trailer ID.

Accordingly, the character recognition device according to the first embodiment can classify the character strings written on the trailer by scoring the character strings according to the level of the possibility of being the trailer ID.

Technique 8

In the character recognition device according to any one of Techniques 1 to 7, the trailer ID estimation unit estimates that there is a high possibility that the character string is the trailer ID when all characters have the same size and equal intervals.

Accordingly, the character recognition device according to the first embodiment can extract a character string having a high possibility of being the trailer ID from the plurality of character strings written on the trailer.

Technique 9

In the character recognition device according to any one of Techniques 1 to 8, the trailer ID estimation unit estimates that there is a low possibility that the character string is the trailer ID when the character string is subjected to character decoration.

Accordingly, the character recognition device according to the first embodiment can extract and exclude a character string having a low possibility of being the trailer ID from the plurality of character strings written on the trailer.

Technique 10

In the character recognition device according to any one of Techniques 1 to 9, the trailer ID estimation unit estimates that there is a high possibility that the character string is the trailer ID when the character string is located above a license plate or in the trailer.

Accordingly, the character recognition device according to the first embodiment can extract a character string having a high possibility of being the trailer ID from the plurality of character strings written on the trailer.

Technique 11

In the character recognition device according to any one of Techniques 1 to 10, the trailer ID estimation unit estimates that there is a low possibility that the character string is the trailer ID when the character string is written on a tractor or is written above or below a company logo.

Accordingly, the character recognition device according to the first embodiment can extract and exclude a character string having a low possibility of being the trailer ID from the plurality of character strings written on the trailer.

Technique 12

In the character recognition device according to any one of Techniques 1 to 11, the trailer ID estimation unit estimates that there is a high possibility that the character string is the trailer ID when the character string includes only capital letters and numbers, when the number of characters of the character string is equal to or less than a predetermined number of characters, or when the character string conforms to a specific rule for each company.

Accordingly, the character recognition device according to the first embodiment can extract a character string having a high possibility of being the trailer ID from the plurality of character strings written on the trailer.

Technique 13

In the character recognition device according to any one of Techniques 1 to 12, the trailer ID estimation unit estimates that the character string is not the trailer ID when the character string is a container ID according to a predetermined specification.

Accordingly, the character recognition device according to the first embodiment can exclude a character string estimated to be the container ID from the plurality of character strings written on the trailer.

Technique 14

In the character recognition device according to any one of Techniques 1 to 13, the attribute is a writing manner of a character, a position of the character string, or a content indicated by the character string.

Accordingly, the character recognition device according to the first embodiment can estimate whether each of the plurality of character strings written on the trailer is the trailer ID based on the attributes. That is, the character recognition device can detect the trailer ID from the plurality of character strings with high accuracy.

Technique 15

In the character recognition device according to any one of Techniques 1 to 14, the trailer ID estimation unit is configured to output an estimation result to a display device.

Accordingly, the character recognition device according to the first embodiment can support a user who uses the character recognition device to identify the trailer using the trailer ID.

Background of Second Embodiment and Third Embodiment

Patent Literature 1 discloses an identical vehicle determination device that does not require calibration for adjusting an installation distance between a front camera and a rear camera by performing accurate relative position measurement. The identical vehicle determination device includes a detection distance estimation unit that estimates a detection distance between the front camera and the rear camera based on a speed and a passing time of a vehicle with a matching number calculated by a vehicle speed calculation unit. The identical vehicle determination device further includes an identical vehicle determination unit that, when numbers of a front license plate recognized by a first recognition unit and numbers of a rear license plate recognized by a second recognition unit do not match, calculates an assumed passing time of the vehicle based on the speed of the vehicle calculated by the vehicle speed calculation unit and the detection distance between the front camera and the rear camera estimated by the detection distance estimation unit. The identical vehicle determination unit determines that the numbers of the rear license plate recognized by the second recognition unit within the assumed passing time are the numbers of the rear license plate of the vehicle.

In recent years, a physical distribution using the trailer TR has flourished, and there is an increasing need to efficiently manage a location of the trailer TR. Here, the trailer TR means a towed vehicle towed by a towing vehicle (also referred to as the tractor LE). The trailer TR may be a set of a container for storing a package and a carriage on which the container is mounted, or may be a vehicle including a portion for storing a package. A plurality of trailers TR may gather at a terminal or the like present in a warehouse or various places (for example, a departure point, a destination point, or a transit point). A very large number of trailers TR gather in a distribution center 100, and thus there is a need to automatically manage the trailers TR entering and exiting the distribution center 100.

In Patent Literature 1, the identical vehicle determination device determines that the vehicles captured by the front camera and the rear camera are the same vehicle when the numbers of the front license plate of the vehicle read by the front camera match the numbers of the rear license plate of the vehicle read by the rear camera. However, when a plurality of vehicles travel in close proximity, there is a possibility that a separation between the vehicles is not determined and the plurality of vehicles are erroneously determined to be one vehicle. In addition, numbers of a license plate of the tractor LE that tows the trailer TR may not match numbers of a license plate attached to the rear of the trailer TR. When the trailer TR is distinguished using the license plate, the numbers of the license plates attached to the tractor LE in the front and rear of the vehicle do not match the numbers of the license plate attached to the trailer TR, and thus the trailer TR and the tractor LE may be erroneously determined to be different vehicles although they are the same vehicle.

In the following second embodiment and third embodiment, an example of a passing determination device that distinguishes trailers that travel in close proximity with high accuracy will be described.

Second Embodiment

Figure 6:
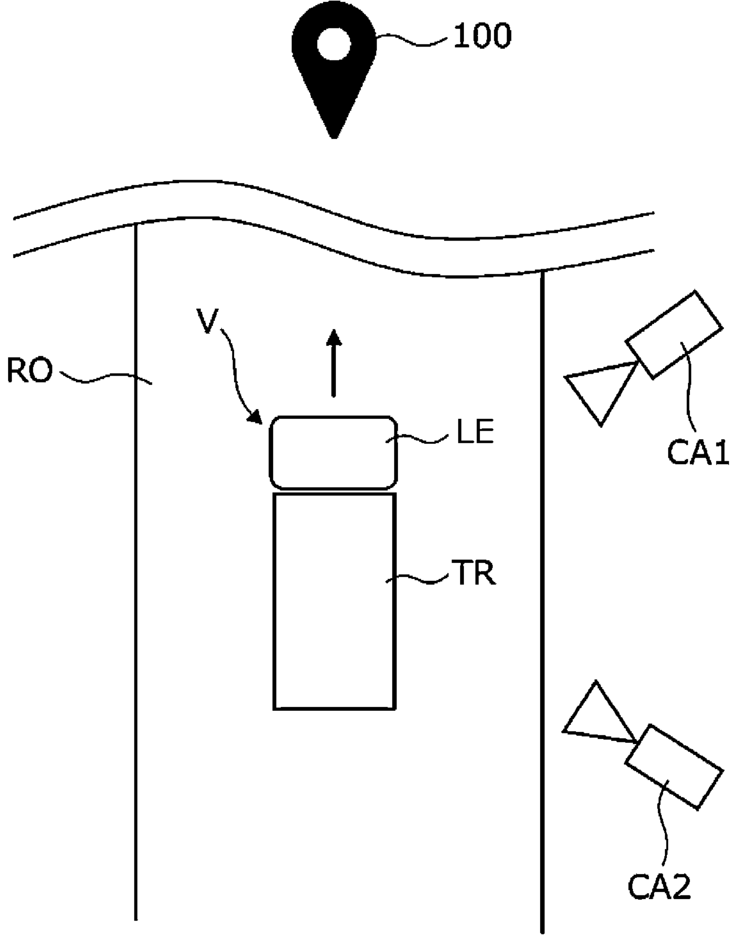
FIG. 6 is a diagram showing an example of an imaging method of a vehicle entering and exiting a distribution center.

First, an example of an imaging method of a vehicle V entering and exiting the distribution center 100 will be described with reference to FIG. 6. FIG. 6 is a diagram showing the example of the imaging method of the vehicle V entering and exiting the distribution center 100.

The vehicle V is traveling on a road RO in an orientation of an arrow. FIG. 6 shows a state in which the vehicle V travels toward the distribution center 100 in a direction approaching the distribution center 100.

A front camera CA1 that captures an image of the vehicle V from diagonally forward and a rear camera CA2 that captures an image of the vehicle V from diagonally rearward are installed on one side of the road RO. The front camera CA1 and the rear camera CA2 are installed at positions at which the passing of the trailer TR is determined (Hereinafter, referred to as "passing determination positions"). As described above, the images of the vehicle V entering the distribution center 100 are captured from the front and the rear by the two cameras.

The front camera CA1 is defined as a camera that captures an image from the front in a traveling direction of the trailer TR. The rear camera CA2 is defined as a camera that captures an image from the rear in the traveling direction of the trailer TR. The example shown in FIG. 6 illustrates a case in which the trailer TR enters the distribution center 100, and when the trailer TR exits the distribution center 100, the rear camera CA2 shown in FIG. 6 functions as a camera that captures an image of the trailer TR from the front, and the front camera CA1 functions as a camera that captures an image of the trailer TR from the rear. Different cameras may be used at the entrance and exit of the trailer TR. Hereinafter, for convenience of description, the following description will be given using the case in which the trailer TR enters the distribution center 100. The passing determination device 50 (see FIG. 7) subjects the trailer TR to the passing determination by using the images captured by the front camera CA1 and the rear camera CA2.

When the vehicle V enters the distribution center 100, the passing determination device 50 can capture an image of the trailer TR with one camera and determine the passing of the trailer TR using the captured image when there is no following vehicle or there is a sufficient distance from the following vehicle. However, when the plurality of trailers TR pass through the passing determination positions in a state in which the plurality of trailers TR are close to each other, it is difficult for the passing determination device 50 to distinguish and determine the trailers TR. Hereinafter, a reason for this will be described. First, the trailers TR generally have similar shapes, and thus it is difficult to distinguish the trailers based on the shapes thereof, and as described above, it is also difficult to accurately acquire information that can be used to distinguish the trailers, such as the trailer ID or the container ID. That is, it is difficult to distinguish the plurality of trailers TR due to the nature of the trailers TR. In addition, when the trailers TR are distinguished by using a color of the trailer TR or the like, the trailers TR may be determined to be different trailers TR even if the trailers TR are the same trailer TR or may be erroneously determined to be an object that is not the trailer TR due to changes in the environment such as lighting or the influence of shadows. Therefore, a function of detecting the trailer TR is implemented by absorbing a small difference between the trailers TR in order to reliably distinguish the trailer TR from an object other than the trailer TR. Therefore, even when the plurality of captured images include different trailers TR, the passing determination device 50 may recognize only that the trailers TR are detected from the respective plurality of captured images. This result cannot be distinguished from a case in which the same trailer TR is detected a plurality of times, and thus there is a possibility that the passing determination device 50 detects the plurality of trailers TR as one trailer TR. In this case, an erroneous determination may occur in which fewer trailers TR than the correct number are determined to pass although the plurality of trailers TR pass. When the erroneous determination occurs, a problem occurs in that the passing determination device 50 cannot correctly manage the trailers TR in the distribution center 100. An example of a case in which correct management is not possible includes a case in which trailers TR having no entry record are present in the distribution center 100 or there is no record of the trailers TR that should have entered. From such a situation, even in a case in which the plurality of trailers TR pass through the passing determination position in close proximity, there is a need to separate the trailers TR and determine the passage with high accuracy.

Figure 7:
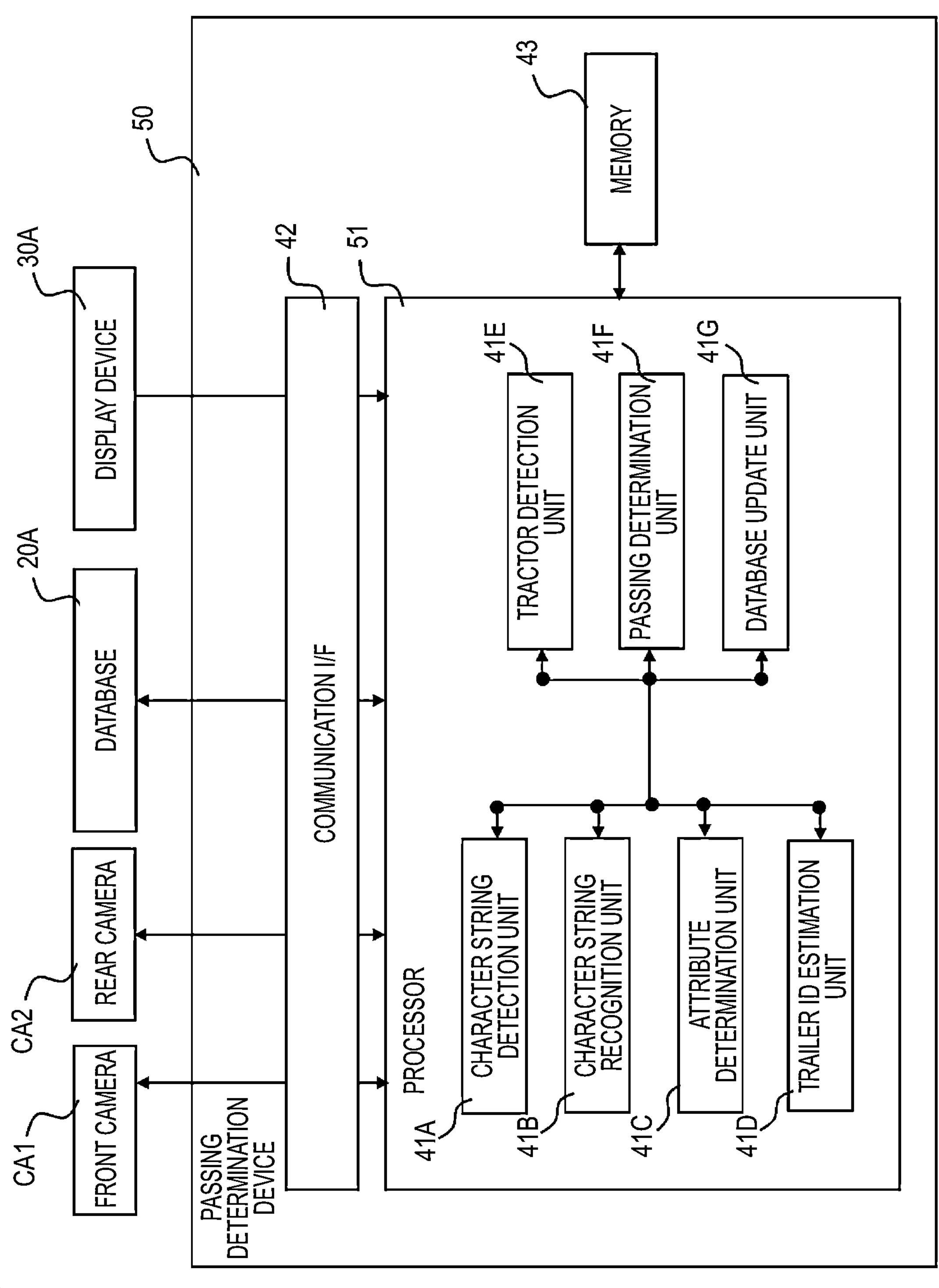
FIG. 7 is a block diagram of a passing determination device according to a second embodiment and a third embodiment.

Next, a block diagram of the passing determination device 50 according to the second embodiment and the third embodiment will be described with reference to FIG. 7. FIG. 7 is the block diagram of the passing determination device 50 according to the second embodiment and the third embodiment. The same components as those of the character recognition system 1 shown in FIG. 2 are denoted by the same reference numerals, and the description thereof is omitted.

The passing determination system 2 includes the front camera CA1, the rear camera CA2, the database 20, the display device 30, and the passing determination device 50.

The front camera CA1 is a device that captures an image of the trailer TR from the front in the traveling direction. The rear camera CA2 is a device that captures an image of the trailer TR from the rear in the traveling direction. The front camera CA1 and the rear camera CA2 include at least a lens (not shown) as an optical element and an image sensor (not shown). The lens receives light reflected from an object within an angle of view of a region imaged by the front camera CA1 and the rear camera CA2 to form an optical image of the object on a light receiving surface (in other words, an imaging surface) of the image sensor. The image sensor is, for example, a solid state image sensor such as a CCD or a CMOS. The image sensor converts the optical image formed on the imaging surface via the lens into an electric signal at every predetermined time (for example, 1/30 (second)). For example, when the predetermined time is 1/30 (second), a frame rate of the front camera CA1 and the rear camera CA2 is 30 fps. The front camera CA1 and the rear camera CA2 may generate captured images by performing predetermined signal processing on the electric signal at every predetermined time described above. The front camera CA1 and the rear camera CA2 output the captured images to the passing determination device 50 via the communication I/F 42. Hereinafter, the image captured by the front camera CA1 is referred to as a first captured image, and the image captured by the rear camera CA2 is referred to as a second captured image.

The database 20A includes a storage medium (for example, a flash memory, an HDD, and an SSD). The database 20A stores identification information (for example, the trailer ID or the container ID) of the trailer TR determined by the passing determination device 50 to pass through the passing determination position. That is, the database 20A stores the identification information of the trailer TR present in the distribution center 100.

The display device 30A displays a determination result executed by the passing determination device 50. The display device 30A is, for example, a touch panel display, a display, or a mobile phone. The display device 30A may be integrated with the passing determination device 50 or may be omitted from the passing determination system 2.

The passing determination device 50 includes the communication I/F 42, the memory 43, and the processor 51. The passing determination device 50 is, for example, a PC or a server device.

The processor 51 is, for example, a CPU, a DSP, a GPU, or an FPGA. The processor 51 functions as a controller that controls the overall operation of the passing determination device 50. The processor 51 performs control processing for controlling operations of respective units of the passing determination device 50, data input and output processing with each of the units of the passing determination device 50, data calculation processing, and data storage processing. The processor 51 operates according to a program stored in the memory 43. The processor 51 uses the memory 43 during operation and temporarily stores data generated or acquired by the processor 51 in the memory 43. The processor 51 implements respective functions of the character string detection unit 41A, the character string recognition unit 41B, the attribute determination unit 41C, the trailer ID estimation unit 41D, a tractor detection unit 41E, a passing determination unit 41F, and a database update unit 41G by using the program and the data stored in the memory 43.

The tractor detection unit 41E detects the tractor LE from the captured images acquired from the front camera CA1 and the rear camera CA2. The tractor detection unit 41E detects a tractor from the captured images using a known Artificial Intelligence (Hereinafter, referred to as "AI") technique such as image recognition.

The passing determination unit 41F detects the trailer TR from the captured images acquired from the front camera CA1 and the rear camera CA2 using the known AI technique such as image recognition. The passing determination unit 41F performs determination that the trailer TR passes through the passing determination positions using information on the detected trailer TR (Hereinafter, referred to as "passing determination"). Here, the passing determination positions are, for example, gates provided at entrance and exit ports of the distribution center 100, the middle of a road toward the entrance and exit ports of the distribution center 100, or the like. The passing determination positions can be set at any position by the user (for example, a business operator who introduces the passing determination system 2), and the front camera CA1 and the rear camera CA2 are installed at the passing determination positions. The passing determination position is not limited to one position, and a plurality of passing determination positions may be provided. The passing determination performed by the passing determination unit 41F will be described in detail later.

The database update unit 41G registers, in the database 20A, the identification information of the trailer TR subjected to passing determination by the passing determination unit 41F. The database update unit 41G may register, in the database 20A, the identification information of the trailer TR in association with a position, a time, and the like at which the passing determination is performed.

Figure 8:
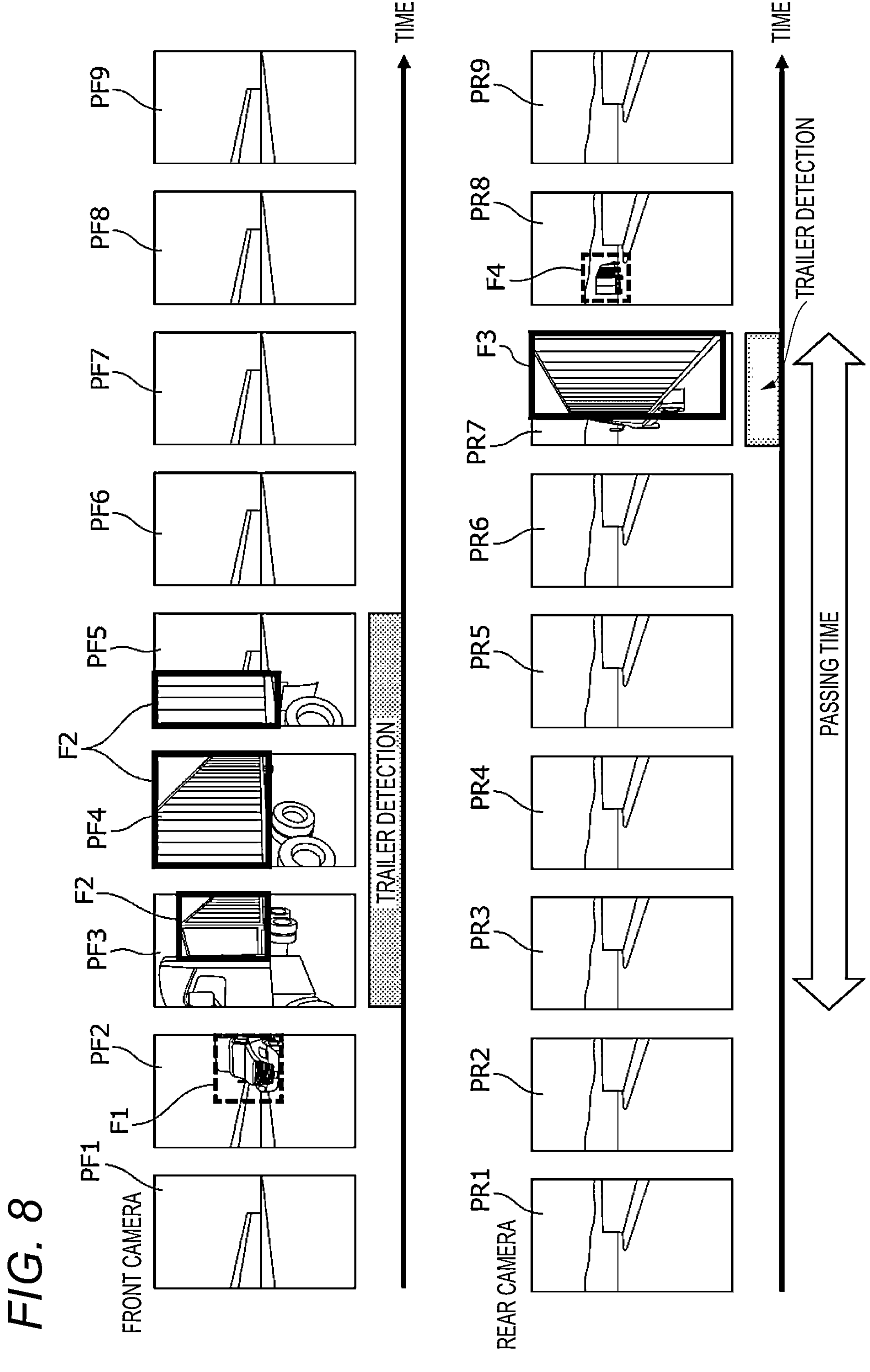
FIG. 8 is a diagram showing an example of time-series data of images captured by a front camera and a rear camera.

Next, an example of time-series data of images captured by the front camera CA1 and the rear camera CA2 will be described with reference to FIG. 8. FIG. 8 is a diagram showing the example of the time-series data of the images captured by the front camera CA1 and the rear camera CA2.

Captured images PF1, PF2, PF3, PF4, PF5, PF6, PF7, PF8, and PF9 are images captured by the front camera CA1. The captured images PF1, PF2, PF3, PF4, PF5, PF6, PF7, PF8, and PF9 are arranged in chronological order in an arrow direction.

In the captured image PF2, the tractor LE is detected in a detection frame F1, and the vehicle V starts to be detected. Thereafter, in the captured image PF3, the trailer TR is first detected in a detection frame F2, and then the trailer TR is detected in the captured images PF4 and PF5. In the captured image PF6, the vehicle V passes through the passing determination position and flames out from the captured image.

Captured images PR1, PR2, PR3, PR4, PR5, PR6, PR7, PR8, and PR9 are images captured by the rear camera CA2. The captured images PR1, PR2, PR3, PR4, PR5, PR6, PR7, PR8, and PR9 are arranged in chronological order in the arrow direction.

In the captured image PR7, the trailer TR is first detected in a detection frame F3. Thereafter, in the captured image PR8, the vehicle V moves away from the passing determination position, and an area of a detection frame F4 of the trailer TR decreases.

When an area in a frame is less than a predetermined threshold value as in the detection frame F1 of the captured image PF2 and the detection frame F4 of the captured image PR8, the passing determination device 50 may set a time when an area in a frame is less than the predetermined threshold value not to be included in a passing time of the trailer TR.

Figure 9:
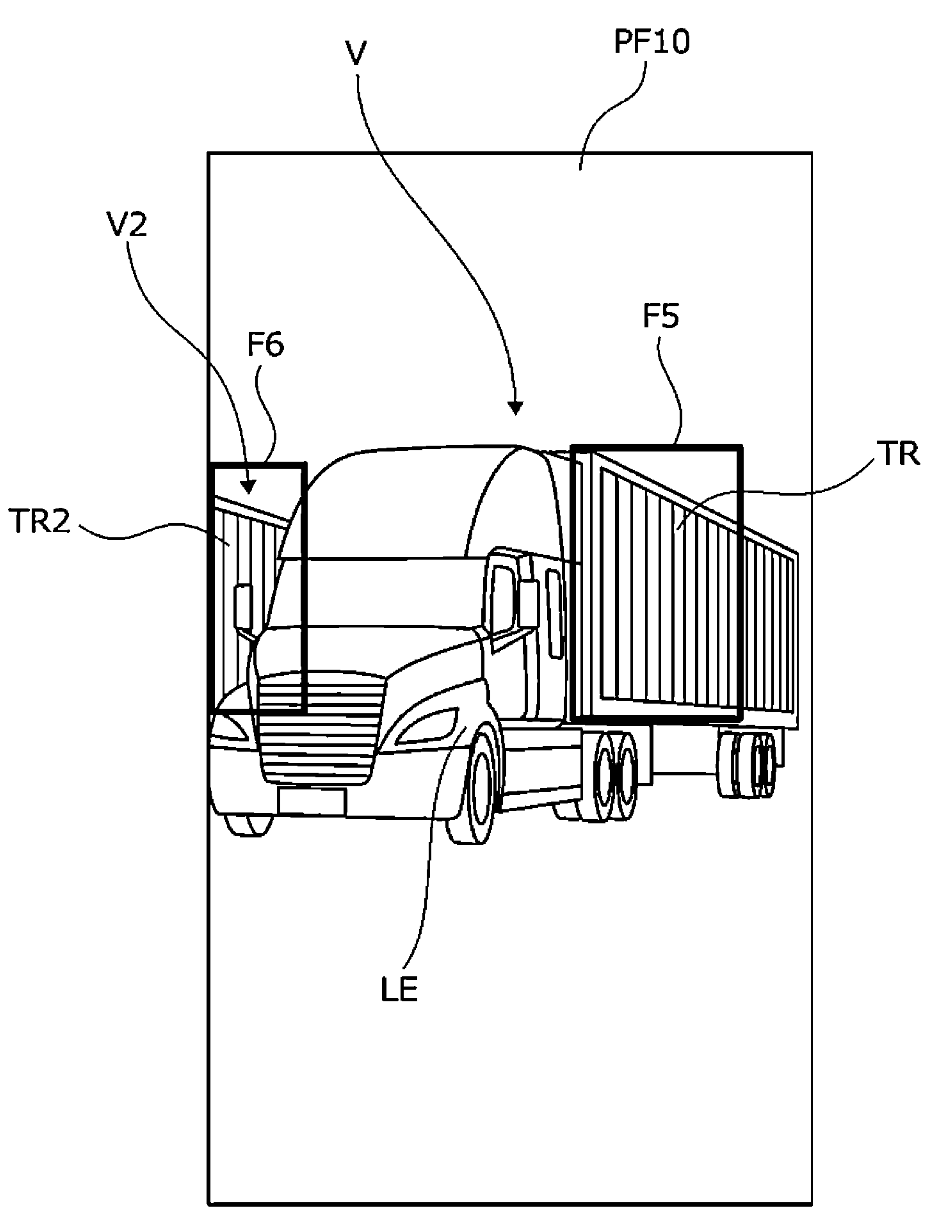
FIG. 9 is a diagram showing sizes of trailer detection frames when a plurality of vehicles are imaged.

Next, detection conditions of the trailer TR will be described with reference to FIG. 9. FIG. 9 is a diagram showing sizes of trailer detection frames when a plurality of vehicles are imaged.

A captured image PF10 is a captured image in which two vehicles (the vehicle V and a vehicle V2) are imaged by the front camera CA1.

A detection frame F5 is a rectangular frame set for the detected trailer TR of the vehicle V. The detection frame is, for example, a frame including the trailer TR therein. The detection frame may be a frame with a minimum area that includes the entire detected trailer TR therein, or may be a frame enlarged at a ratio freely set by the user such as several percent from the frame with a minimum area that includes the entire detected trailer TR. The detection frame may include a wheel or may include only a container portion of the trailer TR. When the detection frame F5 is used for any determination processing, if the user can freely change a range or size of the detection frame, an accuracy of the determination may deteriorate. Therefore, when the detection frame F5 is used for any determination processing, the setting of the detection frame F5 may not be changed by the user. In the example in which the detection frame F5 is used for any determination processing, it is conceivable to use the detection frame F5 as a search range of the trailer ID and the like or estimate whether the detection frame F can appropriately detect the trailer based on a validity of an area of the detection frame F5.

The vehicle V and the vehicle V2 travel side by side adjacent to each other in the traveling direction of the vehicle V. A vehicle to be subjected to passing determination is the vehicle V, but the adjacent vehicle V2 may be detected to cause erroneous determination. In order to prevent a detection result of vehicles other than the vehicle to be subjected to passing determination from being used in the passing determination, a threshold value may be set for the size of the detection frame, and a trailer TR for which a detection frame less than the threshold value is set may be excluded from the passing determination. Accordingly, the passing determination device 50 can prevent erroneous determination such that the trailers TR other than the vehicle to be subjected to passing determination are detected, the trailer TR that does not pass is determined to pass, and identification information of another trailer TR is associated with the trailer TR subjected to passing determination.

Figure 10:
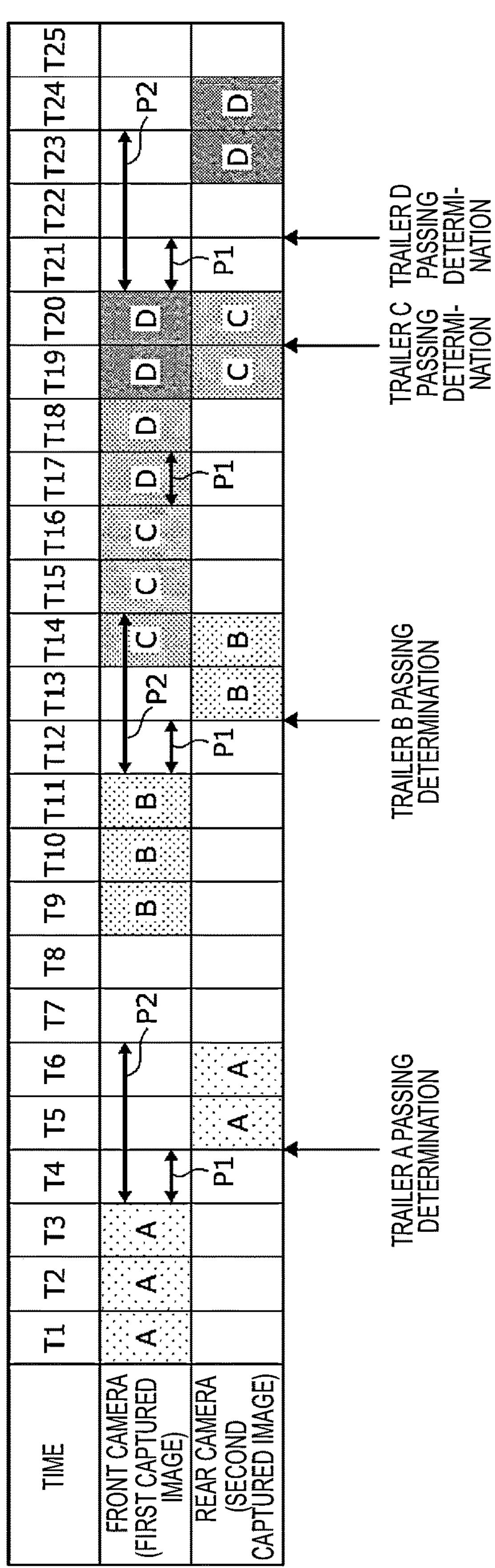
FIG. 10 is a diagram showing several cases of trailer passing determination.

Next, several cases of trailer TR passing determination will be described with reference to FIG. 10. FIG. 10 is a diagram showing several cases of the trailer TR passing determination.

The diagram shown in FIG. 10 is a diagram illustrating trailers A, B, C, and D detected by the front camera CA1 and the rear camera CA2 at respective times T1 to T25. The trailers A, B, C, and D are subjected to passing determination. In FIG. 10, a method in which the passing determination device 50 subjects the trailers A, B, C, and D to the passing determination will be described.

The passing determination device 50 subjects the trailers TR to the passing determination using a first time period P1 and a second time period P2. After detecting the trailer TR from the first captured image, the passing determination device 50 determines that the trailers TR detected within the first time period P1 are the same trailer TR as a trailer TR detected immediately before. Further, the passing determination device 50 determines that the trailer TR detected from the second captured image within the second time period P2 after the last detection of the trailer TR from the first captured image is the same trailer TR as the trailer TR detected from the first captured image. The second time period P2 is a threshold value set from a time when the trailer TR detected in the first captured image is no longer detected. The first time period P1 is set to several seconds such as three seconds. The second time period P2 is set to several tens of seconds such as 120 seconds. Here, when the first time period P1 is too long, there is a high possibility that another subsequent trailer TR is erroneously determined as the same trailer TR, and thus a short time period is set as the first time period P1. On the other hand, there is a high possibility that the trailer TR can be continuously detected in the second captured image obtained by imaging the trailer TR from the rear even when the trailer TR is no longer detected from the first captured image obtained by imaging the trailer TR from the front. Therefore, when the second time period P2 is too short, there is a high possibility that the trailer TR that is no longer detected from the first captured image is erroneously determined as another trailer TR, and thus a long time period is set as the second time period P2. The first time period P1 and the second time period P2 can be freely set by the user, and are not limited to the above examples.

First, a case in which there is no adjacent trailer TR and the trailer TR passes through the passing determination positions alone will be described using the example of the trailer A.

The passing determination device 50 detects the trailer A at the times T1 to T3 in the first captured image. Thereafter, the passing determination device 50 detects the trailer A at the times T5 to T6 in the second captured image. The trailer TR detected at the times T1 to T3 is detected again within the first time period P1 after being detected once, and thus is determined by the passing determination device 50 to be the same trailer A. In addition, the trailer TR detected from the second captured image at the time T5 is detected within the second time period P2 after the trailer A is detected by the front camera CA1 at the time T3, and is determined by the passing determination device 50 to be the same trailer A as the trailer TR detected in the first captured image at the time T3. The passing determination device 50 detects the trailer A from the first captured image, and then subjects the trailer A to the passing determination at the time T5 when the trailer A is first detected from the second captured image.

Next, a case in which the trailers TR pass through the passing determination positions in close proximity will be described using the examples of the trailer B, C, and D.

The passing determination device 50 detects the trailer B at the times T9 to T11 in the first captured image. Thereafter, the passing determination device 50 detects the trailer B at the times T13 to T14 in the second captured image. The trailer TR detected in the first captured image at the times T9 to T11 is detected within the first time period P1 after being detected once, and thus is determined by the passing determination device 50 to be the same trailer B. In addition, the trailer TR detected in the second captured image at the time T13 is detected within the second time period P2 after the trailer B is detected by the front camera CA1 at the time T11, and is determined by the passing determination device 50 to be the same trailer B as the trailer TR detected by the front camera CA1 at the time T11. The passing determination device 50 detects the trailer B from the first captured image, and then subjects the trailer B to the passing determination at the time T13 when the trailer B is first detected from the second captured image.

The passing determination device 50 detects the trailer C at the times T14 to T18 in the first captured image. Thereafter, the passing determination device 50 detects the trailer C at the times T19 to T20 in the second captured image. The trailer TR detected from the first captured image at the times T14 to T18 is detected within the first time period P1 after being detected once, and thus is determined by the passing determination device 50 to be the same trailer C. However, the trailer C is actually imaged by the front camera CA1 at the times T14 to T16, but the trailer D is present behind the trailer C in close proximity, and thus the separation between the trailers TR is not determined, and the trailer TR detected at the times T17 to T18 is also recognized as the trailer C.

The passing determination device 50 detects the trailer C in the first captured image, and then detects the trailer TR in the second captured image for the first time at the time T19. The passing determination device 50 detects the trailer TR in the second captured image at the time T19, and thus determines the trailer TR detected in the first captured image at the time T19 as the trailer D different from the trailer C. The passing determination device 50 detects the trailer C in the second captured image at the time T19, and thus subjects the trailer C to the passing determination at the time T19.

The passing determination device 50 detects the trailer D at the times T19 to T20 in the first captured image. Thereafter, the passing determination device 50 detects the trailer D at the times T23 to T24 in the second captured image. The trailer D is traveling in close proximity to the trailer C, and thus the passing determination device 50 determines that the trailer TR is the trailer C although the trailer TR actually appearing in the first captured image at the times T17 to T18 is the trailer D. The trailer C is first detected in the second captured image at the time T19, and thus the passing determination device 50 determines that the trailer TR detected in the first captured image at the time T19 is the trailer D. In addition, the trailer TR detected from the second captured image at the time T23 is detected within the second time period P2 after the trailer D is detected from the first captured image at the time T20, and the passing determination device 50 determines that the trailer TR detected from the second captured image at the time T23 is the same trailer D as the trailer TR detected form the first captured image at the time T20.

As described above, in the present embodiment, even in a situation in which it is difficult to distinguish between the trailer C and the trailer D in only the first captured image, it is possible to determine that the trailer D appears by using the information on the second captured image. In the present embodiment, it is difficult to accurately determine a timing at which the trailer D starts to appear in the first captured image, but at least the presence of the trailer D can be recognized, and thus a recognition accuracy of the trailer is improved as compared with a case in which it is erroneously recognized that only the trailer C is present by using only the first captured image.

Figure 11:
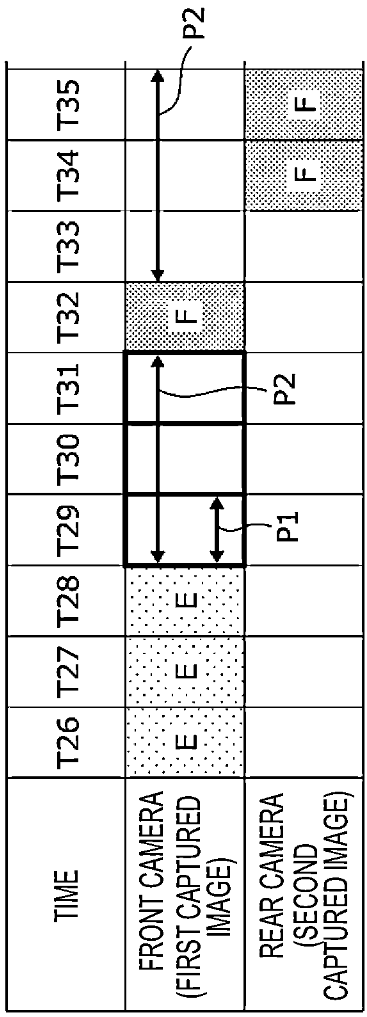
FIG. 11 is a diagram showing a first case in which no trailer is detected for a second time period or longer.

Next, a case in which the trailers TR are not detected for the second time period P2 or longer will be described with reference to FIGS. 11 and 12. FIG. 11 is a diagram showing a first case in which no trailer TR is detected for the second time period P2 or longer. FIG. 12 is a diagram showing a second case in which no trailer TR is detected for the second time period P2 or longer.

In FIG. 11, the passing determination device 50 detects a trailer E in the first captured image at times T26 to T28. Thereafter, the passing determination device 50 does not detect the trailer TR in both the first captured image and the second captured image at times T29 to T31. Thereafter, the passing determination device 50 detects the trailer TR from the first captured image at a time T32. At the time T32, a time period equal to or longer than the second time period P2 elapses since the trailer E is detected at the time T28, and thus the passing determination device 50 determines that the trailer TR detected at the time T32 is a trailer F different from the trailer E, and subjects the trailer E to the passing determination.

In FIG. 12, the passing determination device 50 detects the trailer E in the first captured image at the times T26 to T28. Thereafter, the passing determination device 50 does not detect the trailer TR in both the first captured image and the second captured image at the times T29 to T33. Thereafter, the passing determination device 50 detects the trailer TR from the second captured image at a time T34. At the time T34, a time period equal to or longer than the second time period P2 elapses since the trailer E is detected at the time T28, and thus the passing determination device 50 determines that the trailer TR detected at the time T34 is the trailer F different from the trailer E, and subjects the trailer E to the passing determination.

As described above, the passing determination device 50 detects the trailer TR from the images captured by the front camera CA1 and the rear camera CA2, and performs the passing determination using the first time period P1 and the second time period P2.

Figure 13:
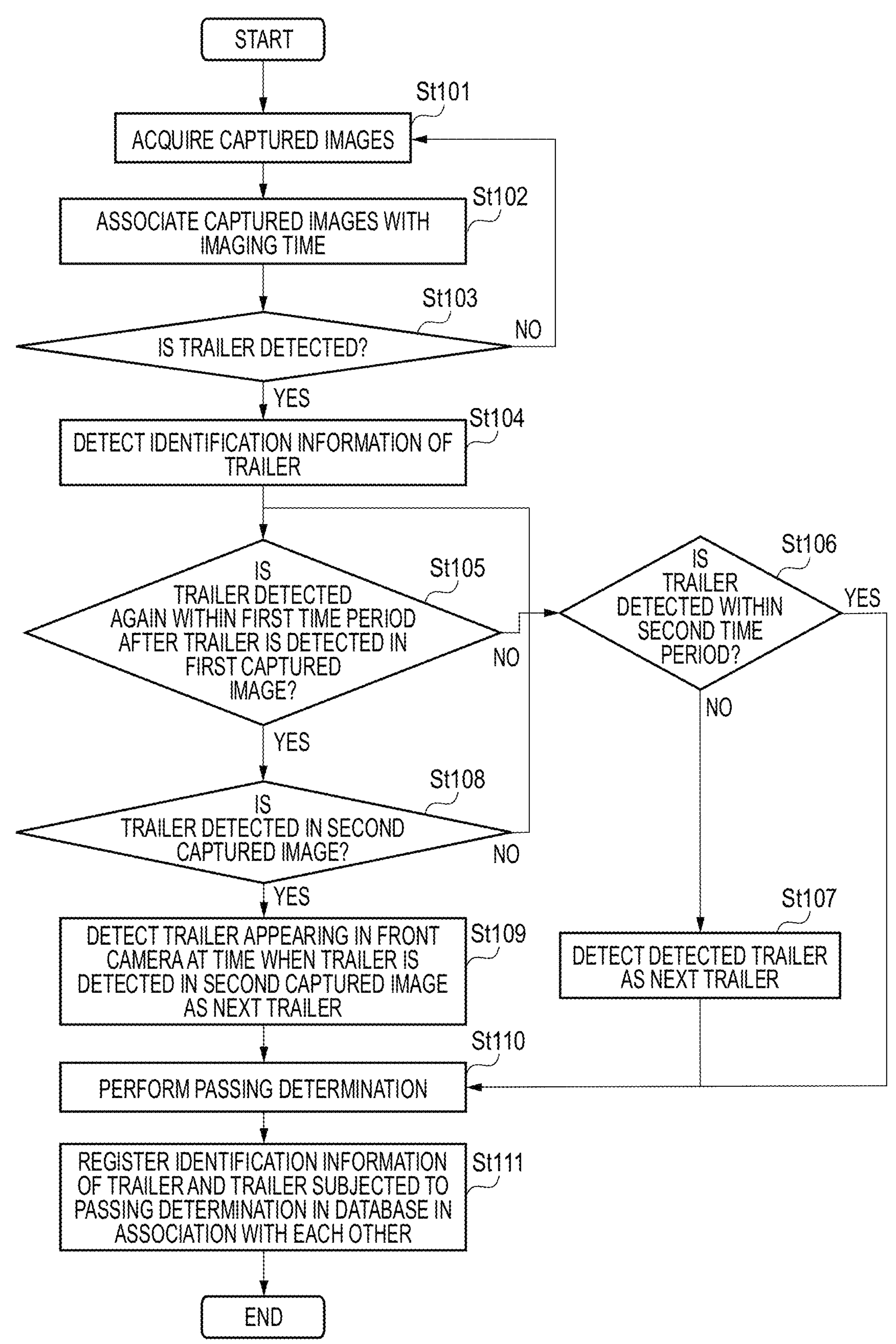
FIG. 13 is a flowchart showing an example of processing of trailer passing determination.

Next, an example of processing of trailer TR passing determination will be described with reference to FIG. 13. FIG. 13 is a flowchart showing the example of the processing of the trailer TR passing determination.

The processor 51 acquires the captured images from the front camera CA1 and the rear camera CA2 (step St101). It is assumed that the processor 51 acquires captured images from the front camera CA1 and the rear camera CA2 at predetermined time intervals while executing the processing of the flowchart in FIG. 13.

The processor 51 associates the acquired captured images with a current time as an imaging time (step St102).

The passing determination unit 41F analyzes the captured images acquired in the processing of step St101 and determines whether the trailer TR is detected (step St103).

When it is determined that no trailer TR is detected (step St101, NO), the passing determination unit 41F executes the processing of step St101 again. For example, the passing determination unit 41F determines that no trailer TR is detected when no vehicle appears in the captured images, or when the tractor LE (that is, only the tractor LE) that does not tow the trailer TR, or a vehicle that does not provide the trailer TR such as a passenger vehicle is detected.

When it is determined that the trailer TR is detected (step St101, YES), the passing determination unit 41F outputs an instruction to detect character strings written on the trailer TR to the character string detection unit 41A. The processor 51 uses the functions of the character string detection unit 41A, the character string recognition unit 41B, the attribute determination unit 41C, and the trailer ID estimation unit 41D to detect a trailer ID as the identification information of the trailer TR from the character strings written on the trailer TR by using the method described in the first embodiment (step St104). The processor 51 may detect a container ID as the identification information of the trailer TR without being limited to the trailer ID.

The passing determination unit 41F determines whether the trailer TR is detected again within the first time period after the trailer TR is detected in the first captured image (step St105).

When no trailer TR is detected again within the first time period after the trailer TR is detected in the first captured image (step St105, NO), the passing determination unit 41F determines whether the trailer TR is detected within the second time period in the first captured image or the second captured image after the trailer TR is finally detected from the first captured image (step St106).

When the trailer TR is detected within the second time period in the first captured image or the second captured image after the trailer TR is finally detected from the first captured image (step St106, YES), the passing determination unit 41F performs the passing determination to determine that the trailer TR passes (step St110). The case of YES in the processing of step St106 is, for example, a case of the trailer A, the trailer B, and the trailer D shown in FIG. 10.

When no trailer TR is detected within the second time period in the first captured image or the second captured image (step St106, NO), and when the trailer TR is detected in the first captured image or the second captured image at a time exceeding the second time period, the passing determination unit 41F detects the trailer TR as a next trailer TR (step St107). The trailer TR detected as a next trailer TR in the processing of step St107 is, for example, the trailer F shown in FIGS. 11 and 12. After the processing of step St107, the passing determination unit 41F subjects the trailer TR detected by the front camera CA1 to the passing determination (step St110). In the processing of step St106, the passing determination unit 41F may subject the trailer TR to the passing determination when no trailer TR is detected by the rear camera CA2 at the time exceeding the second time period.

When the trailer TR is detected again within the first time period after the trailer TR is detected in the first captured image (step St105, YES), the passing determination unit 41F determines whether the trailer TR is detected in the second captured image (step St108).

When it is determined that no trailer TR is detected in the second captured image (step St108, NO), the passing determination unit 41F executes the processing of step St105 again. The case of NO in the processing of step St108 is, for example, a case in which the trailer C is detected within the first time period in the first captured image at the times T14 to T18 in FIG. 10, and the trailer C is not yet detected in the second captured image. That is, the passing determination unit 41F repeatedly executes the processing of step St105 and the processing of step St108 while continuously detecting the trailer TR within the first time period in the first captured image.

When it is determined that the trailer TR is detected in the second captured image (Step St108, YES), the passing determination unit 41F detects the trailer TR appearing in the first captured image at a time when the trailer TR is detected in the second captured image as a next trailer (Step St109). The case in which the processing of step St109 is executed corresponds to, for example, the case of the trailer C and the trailer D at the time T19 shown in FIG. 10.

The passing determination unit 41F subjects the trailer TR detected from the first captured image to the passing determination (step St110). The passing determination unit 41F outputs information on the trailer TR subjected to passing determination to database update unit 41G. The examples of the information on the trailer TR subjected to passing determination include the identification information on the trailer TR detected by the passing determination unit 41F in the processing of step St104, a time when the trailer TR is determined to pass, and the passing determination positions.

The database update unit 41G registers the identification information of the trailer and the trailer TR subjected to passing determination in the database 20A in association with each other (step St111).

As described above, the passing determination device 50 can distinguish the plurality of trailers TR that travel in close proximity with high accuracy using two cameras, that is, the front camera CA1 and the rear camera CA2, and subject the trailers TR to the passing determination. The passing determination device 50 can determine the trailers TR passing through the passing determination positions with high accuracy, and thus can accurately manage the trailers TR in the distribution center 100. Accordingly, the passing determination device 50 can assist the user in managing the trailers TR in the distribution center 100.

The passing determination device 50 can determine whether the trailers detected in the first captured image and the second captured image are the same trailer or different trailers by the processing of step St106. Accordingly, the passing determination device 50 can manage which trailer appearing in the captured image is a trailer determined to pass. That is, the passing determination device 50 can manage which trailer appearing in the captured image is a trailer determined to pass, and thus the passing determination device 50 can store and manage an image of the trailer determined to pass in the database 20A without being mixed with images of the different trailers. In addition, the passing determination device 50 may adopt, as a trailer ID or a container ID of each trailer, an ID that is highly likely to be correct among IDs detected from a group of images determined to be of the same trailer (refer to the first embodiment for determining whether the ID is correct). Accordingly, the number of images that are candidates for detecting a trailer ID or a container ID increases, and thus the passing determination device 50 can more accurately detect the trailer ID or the container ID even when the trailer ID or the container ID is written at a position at which the detection is difficult at a specific angle. In particular, under a predetermined condition, the passing determination device 50 determines that the first captured image captured by the front camera CA1 and the second captured image captured by the rear camera CA2 include the same trailer TR. Therefore, when the trailer ID or the container ID is written at a position that can only be detected from the front or the rear, the trailer ID or the container ID can also be detected from an image captured by any camera.

The passing determination device 50 may assign the same trailer ID or container ID to images from which the trailers are determined to be the same trailer and record the images in the database 20A. Accordingly, when the trailer ID or the container ID can be detected from only some of the plurality of images determined to be the same trailer, the trailer ID or the container ID can be assigned to the captured images in which the trailer ID or the container ID cannot be detected. Accordingly, for example, the passing determination device 50 can collectively extract images captured from various viewpoints when it is desired to confirm the images of the trailers to which the same ID is assigned.

In the present embodiment, as a method of detecting a trailer TR, a method of detecting an object having a high possibility of being the trailer TR from a captured image by image recognition and a method of regarding that the trailer TR is detected when the trailer ID is detected from the captured image are conceivable. Each situation described in the present embodiment may occur when any method is adopted. The ease of occurrence of the situation may be different depending on the adopted method. For example, the situation in FIG. 11 is more likely to occur in the case of adopting the method of regarding the detection of the trailer ID as the detection of the trailer TR than in the case of adopting the method of detecting the trailer TR by image recognition. Hereinafter, a reason for this will be described. When the trailer TR is traveling along a regular route, the trailer TR imaged by the front camera CA1 necessarily passes through an imaging range of the rear camera CA2 thereafter. Therefore, if an accuracy of the image recognition is sufficiently high, there is no situation in which the trailer TR is detected from the image captured by the front camera CA1 and the trailer TR cannot be detected from the image captured by the rear camera CA2 unless the trailer TR is returned immediately after being captured by the front camera CA1 or the trailer TR is moved away from the regular route. On the other hand, in the method of regarding that the trailer TR is detected when the trailer ID is detected, when the trailer ID is written at a position that can only be seen by the front camera CA1, there is a situation in which the trailer TR is detected from the image captured by the front camera CA1, and the trailer TR cannot be detected from the image captured by the rear camera CA2.

Third Embodiment

In the first embodiment, the method has been described in which two cameras, that is, the front camera CA1 and the rear camera CA2, are used, and the first time period P1 and the second time period P2 are used to distinguish the plurality of vehicles that pass through the passing determination positions in close proximity. Next, in the third embodiment, a second method of distinguishing a plurality of vehicles that pass through passing determination positions in close proximity will be described.

Figure 14:
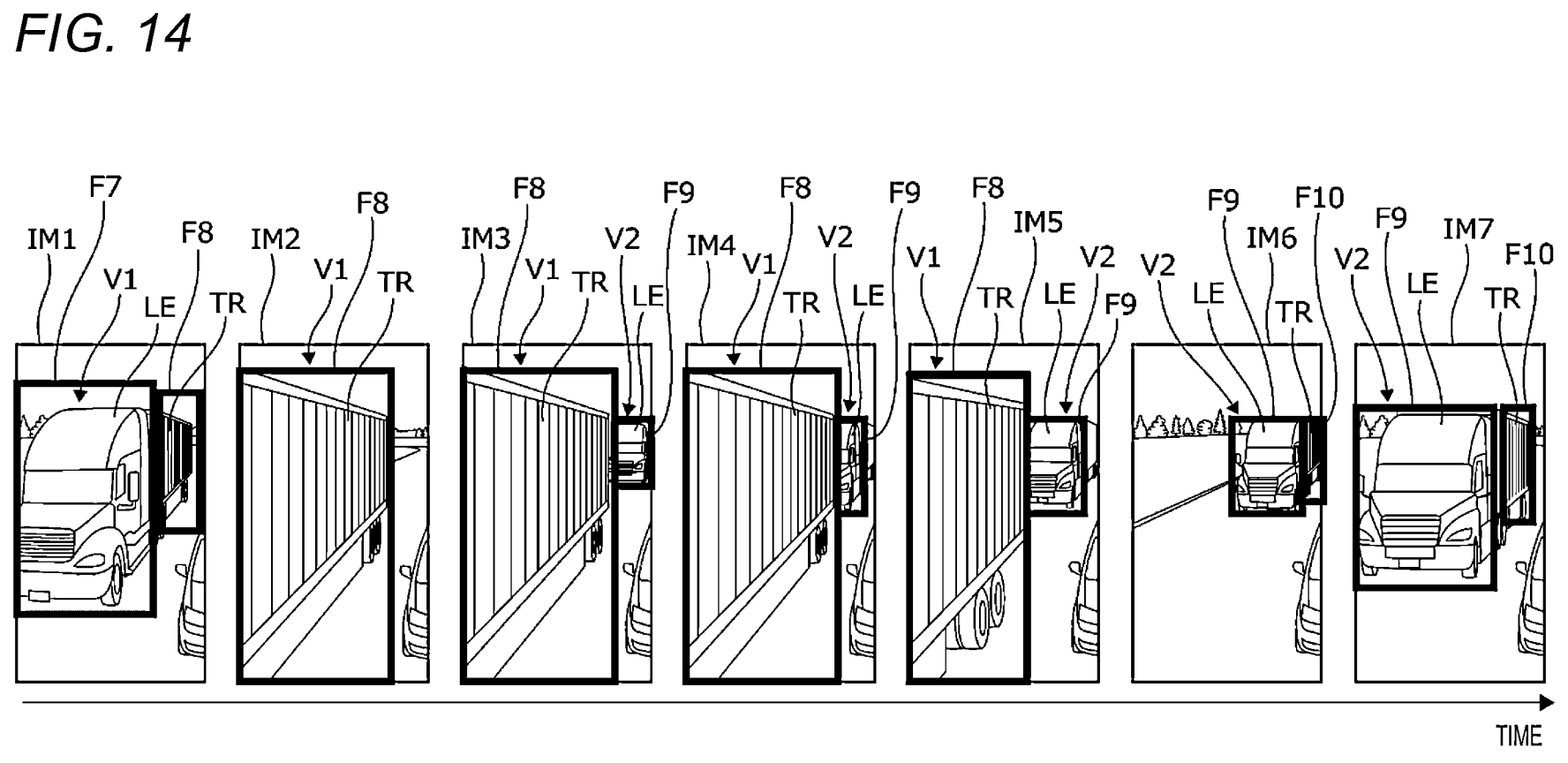

First, an example of time-series data of captured images of two trailers TR that travel in close proximity will be described with reference to FIG. 14. FIG. 14 is a diagram showing the example of the time-series data of the captured images of the two trailers TR that travel in close proximity.

Captured images IM1, IM2, IM3, IM4, IM5, IM6, and IM7 are images captured by the front camera CA1. The captured images IM1, IM2, IM3, IM4, IM5, IM6, and IM7 are arranged in chronological order in an arrow direction.

The tractor detection unit 41E detects a tractor LE of a vehicle V1 in a detection frame F7 from the captured image IM1. The passing determination unit 41F detects a trailer TR in a detection frame F8 from the captured image IM1.

Thereafter, the tractor detection unit 41E detects a tractor LE of the vehicle V2 in a detection frame F9 from the captured image IM3. In the captured images IM3 and IM5, the passing determination device 50 detects the vehicle V2 in the same captured image as the vehicle V1. That is, the vehicle V2 is traveling in close proximity to the vehicle V1.

Thereafter, the trailer TR of the vehicle V1 disappears from the angle of view of the front camera CA1 in the captured images IM6 and IM7, and the passing determination device 50 detects only the vehicle V2.

In the third embodiment, a passing determination method in a case in which a plurality of vehicles pass through passing determination positions in close proximity will be described.

Figure 15:
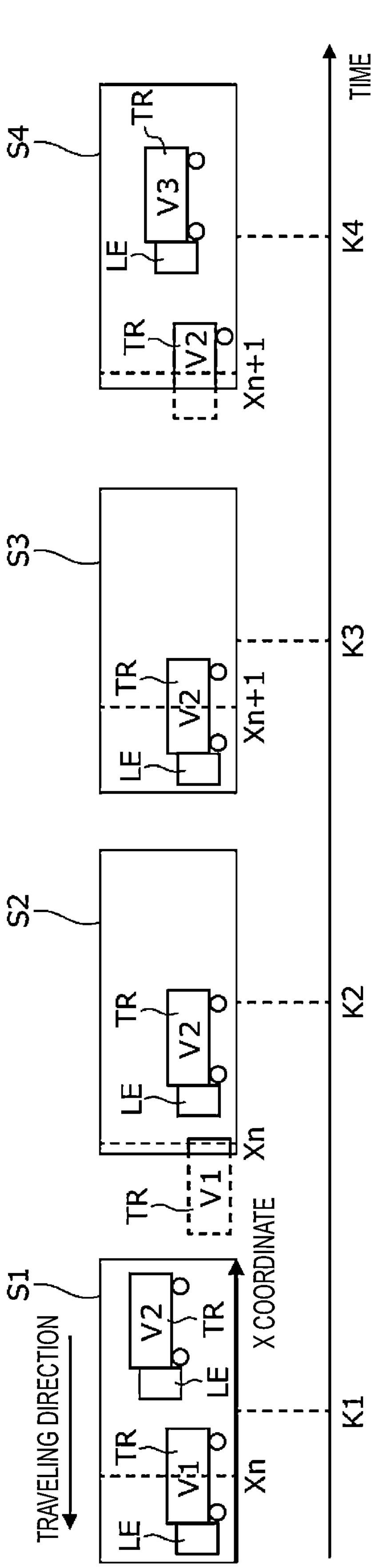
FIG. 15 is a diagram showing a passing determination method according to the third embodiment.

Next, the passing determination method according to the third embodiment will be described with reference to FIG. 15. FIG. 15 is a diagram showing the passing determination method according to the third embodiment.

A schematic diagram S1 is a schematic diagram of a first captured image at a time K1. A schematic diagram S2 is a schematic diagram of the first captured image at a time K2. A schematic diagram S3 is a schematic diagram of the first captured image at a time K3. A schematic diagram S4 is a schematic diagram of the first captured image at a time K4. The times K1 to K4 elapse in an arrow direction, and the time K4 is a time later than the time K1.

The passing determination device 50 sets an X axis from one side of an outer periphery of the captured image to a side opposite to the traveling direction of the vehicle V. In the example of FIG. 15, the passing determination device 50 sets the X axis with an opposite direction to the traveling direction of the vehicle V as a positive direction. A method of setting an X axis is not limited to the above example. For example, the passing determination device 50 may set any direction corresponding to the traveling direction of the vehicle V as the X axis. That is, the setting direction of the X axis may be a direction correlated with the traveling direction of the vehicle, and is not necessarily parallel to the traveling direction of the vehicle.

The passing determination device 50 calculates an X coordinate of the trailer TR from the first captured image. When a plurality of vehicles are detected in the first captured image, the passing determination device 50 calculates an X coordinate of only a trailer TR of one vehicle traveling ahead in the traveling direction. The passing determination device 50 may calculate not only the X coordinate of only one trailer TR but also X coordinates of all the vehicles appearing in the captured image. In this case, the passing determination device 50 sets, for example, an X coordinate of the trailer TR in which an area of a detection frame set in the trailer TR is largest as a passing determination target. The passing determination device 50 may set a trailer TR having a smallest detected X coordinate as a passing determination target. Hereinafter, the passing determination device 50 calculates the X coordinate of only the trailer TR of one vehicle traveling ahead in the traveling direction.

The passing determination device 50 detects the vehicle V1 and the vehicle V2 at the time K1. The passing determination device 50 sets the vehicle V1 ahead in the traveling direction as a vehicle to be subjected to passing determination. The passing determination device 50 calculates a coordinate Xn which is an X coordinate of the trailer TR of the vehicle V1 in the first captured image at each time. The passing determination device 50 calculates an X coordinate of a center of a detection frame (not shown) set in the trailer TR. The X coordinate calculated by the passing determination device 50 is not limited to the center of the detection frame, and may be any position of the detection frame set in advance by the user. For example, a smallest X coordinate and a largest X coordinate of the detection frame, or an X coordinate of a portion obtained by dividing the X coordinate of the detection frame at a predetermined ratio may be calculated.

At the time K2, a value of the coordinate Xn decreases as the vehicle V1 travels.

At the time K3, the vehicle V1 further travels and flames out from the angle of view of the front camera CA1, and the passing determination device 50 detects only the vehicle V2. The passing determination device 50 calculates a coordinate Xn+1 which is an X coordinate of the trailer TR of the vehicle V2. When the coordinate Xn at the time K2 and the coordinate Xn+1 at the time K3 are compared with each other, a value of the coordinate Xn+1 is greater than the value of the coordinate Xn. Normally, the value of the X coordinate of the trailer TR of the same vehicle decreases as the vehicle travels. That is, an increase in the value of the X coordinate indicates that, among the vehicles traveling in close proximity, a front vehicle flames out from the front camera CA1, and the following vehicle is detected by the front camera CA1.

Here, the passing determination device 50 is intended to determine that the front vehicle (that is, the front trailer TR) passes triggered by an increase in the X coordinate of the trailer TR. However, the passing determination device 50 may erroneously detect a trailer TR different from the passing determination target appearing in the first captured image (for example, the trailer TR that is stopped) or an object other than the trailer TR, and may determine that the X coordinate increases. In order to prevent such erroneous determination, when the X coordinate of the trailer TR increases, the passing determination device 50 determines that the front trailer TR, which is a passing determination target, passes since the tractor LE is detected at an X coordinate between the X coordinate before the increase and the X coordinate after the increase.

Figure 16:
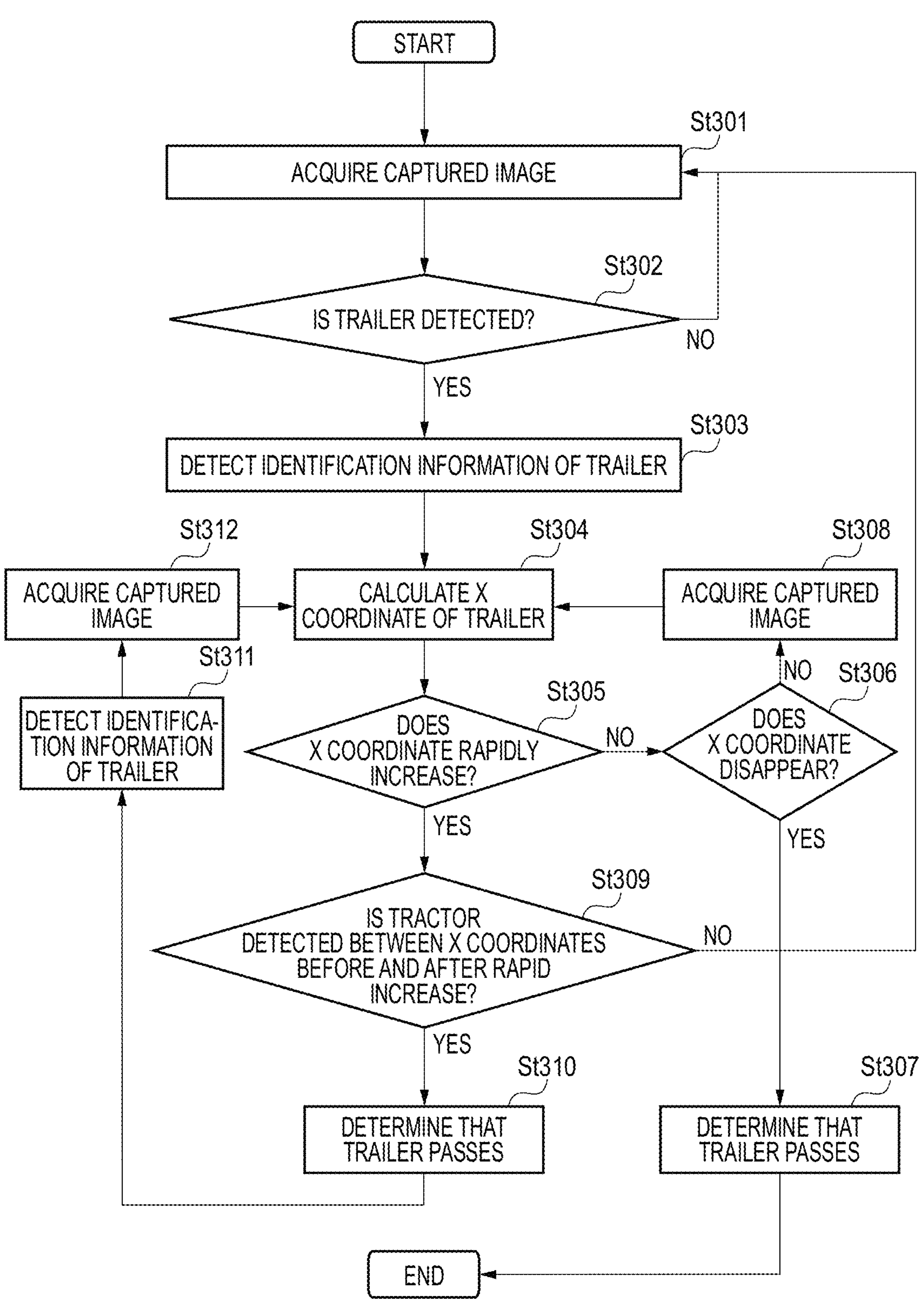
FIG. 16 is a flowchart showing an example of a passing determination processing of a trailer according to the third embodiment.

Next, an example of a passing determination processing of the trailer TR according to the third embodiment will be described with reference to FIG. 16. FIG. 16 is a flowchart showing the example of the passing determination processing of the trailer TR according to the third embodiment.

The processor 51 acquires a captured image from the front camera CA1 (step St301).

The passing determination unit 41F determines whether the trailer TR is detected from the captured image (step St302).

When it is determined that no trailer TR is detected from the captured image (step St302, NO), the passing determination unit 41F executes the processing of step St301 again.

When it is determined that the trailer TR is detected from the captured image (step St302, YES), the passing determination unit 41F outputs an instruction to detect character strings written on the trailer TR to the character string detection unit 41A. The processor 51 uses the functions of the character string detection unit 41A, the character string recognition unit 41B, the attribute determination unit 41C, and the trailer ID estimation unit 41D to detect a trailer ID as the identification information of the trailer TR from the character strings written on the trailer TR by using the method described in the first embodiment (step St303). The processor 51 may detect a container ID as the identification information of the trailer TR without being limited to the trailer ID.

The passing determination unit 41F calculates the X coordinate of the trailer TR as a passing determination target (step St304).

The passing determination unit 41F determines whether the X coordinate calculated in the processing of step St304 rapidly increases from an X coordinate calculated at the immediately previous time (step St305). The processor 51 acquires captured images from the front camera CA1 at predetermined time intervals, and the X coordinate calculated at the immediately previous time is an X coordinate of the trailer TR calculated from the captured image acquired immediately before the captured image used for the calculation of the X coordinate in the processing of step St304.

When it is determined that the X coordinate does not rapidly increase (step St305, NO), the passing determination unit 41F determines whether the X coordinate disappears (step St306).

When it is determined that the X coordinate does not disappear (that is, the trailer TR as a passing determination target does not flame out from the front camera CA1) (step St306, NO), the passing determination unit 41F acquires a captured image again from the front camera CA1 (step St308). After executing the processing of step St308, the passing determination unit 41F executes the processing of step St304 again.

When it is determined that the X coordinate disappears (step St306, YES), the passing determination unit 41F determines that the trailer TR as a passing determination target flames out from the front camera CA1, and determines that the trailer TR passes (step St307).

When it is determined that the X coordinate rapidly increases (step St305, YES), the passing determination unit 41F determines whether the tractor LE is detected between the X coordinates before and after the rapid increase (step St309).

When it is determined that no tractor LE is detected between the X coordinates before and after the rapid increase (step St309, NO), the passing determination unit 41F executes the processing of step St301 again. In the case of NO in the processing of step St309, there is a high possibility that the rapid increase in the X coordinate is erroneously determined. For this reason, the processor 51 restarts from the processing of step St301. As will be described later, the passing determination processing according to the third embodiment may be executed at the same time as the passing determination processing according to the second embodiment, and in the case of NO in the processing of step St309 in FIG. 12, the passing determination processing of the trailer TR is executed using the passing determination processing according to the second embodiment.

When it is determined that the tractor LE is detected between the X coordinates before and after the rapid increase (step St309, YES), the passing determination unit 41F determines that the trailer TR passes (step St310).

After it is determined that the trailer TR as a passing determination target passes in the processing of step St310, the passing determination unit 41F proceeds to a passing determination processing of a trailer TR of the following vehicle. The passing determination unit 41F detects identification information of the trailer TR of the following vehicle (step St311). The processing in step St311 is the same as the processing in step St303.

The passing determination unit 41F acquires a captured image from the front camera CA1 (step St312). After the processing of step St312, the passing determination unit 41F executes the processing of step St304.

As described above, the passing determination device 50 can distinguish the plurality of trailers TR that travel in close proximity with high accuracy. Accordingly, the passing determination device 50 can subject the trailers TR to the passing determination processing with high accuracy and accurately manage the trailers TR present in the distribution center 100. In addition, the passing determination device 50 can subject the trailers TR to the passing determination processing with high accuracy by one camera.

In the present embodiment, the passing determination device 50 also uses the coordinate at which each trailer is detected for the passing determination processing, and thus it is possible to accurately distinguish the trailer C and the trailer D which are difficult to be distinguished from each other by using the method of the second embodiment based on the time when the trailer is detected.

In the third embodiment, the opposite direction to the traveling direction of the vehicle V is set as the positive direction of the X axis, and is merely an example. Any one of the setting directions on the X axis may be set as the positive direction. For example, when the direction along the traveling direction of the vehicle V is set to the positive direction of the X axis, the same passing determination processing can be performed by replacing the rapid increase in the X coordinate in the above processing with the rapid decrease in the X axis. Whether a rapid change (rapid increase or rapid decrease) in the coordinate occurs can be determined based on, for example, whether an amount of change in the coordinate at a predetermined time is equal to or greater than a predetermined threshold value. The predetermined time may be, for example, a time corresponding to a certain number of frames set by the user. The predetermined threshold value may be any value set by the user, or may be a value based on an average value of the amounts of change of the past coordinate.

The passing determination device 50 may simultaneously execute the passing determination processing described in the second embodiment and the passing determination processing described in the third embodiment. Accordingly, the passing determination device 50 can also subject the plurality of trailers TR that travel in close proximity to the passing determination processing with high accuracy. In addition, the passing determination device 50 preferentially adopts the result of the passing determination processing described in the third embodiment in the passing determination processing of the trailers TR that travel in close proximity. That is, when it is determined that the trailers TR pass in the passing determination processing described in the third embodiment, the passing determination device 50 determines that the trailers TR also pass in the passing determination processing described in the second embodiment, and proceeds to the passing determination processing of the subsequent place.

Summary of Second Embodiment and Third Embodiment

The following techniques are disclosed by the above description of the second embodiment and the third embodiment.

Technique 1

A passing determination device according to the present embodiment includes: a processor configured to acquire a first captured image obtained by repeatedly capturing an image of a region including a passing determination position of a trailer from the front in a traveling direction of the trailer, perform processing of detecting the trailer from the first captured image, and determine that the trailer detected from the first captured image captured at a first time passes through the passing determination position when the trailer is detected from the first captured image captured at the first time and the trailer is not detected from the first captured image captured within a first time period from the first time.

Accordingly, the passing determination device according to the present embodiment can distinguish trailers that travel in close proximity with high accuracy. Accordingly, the passing determination device can determine the trailers passing through the passing determination position with high accuracy, and can accurately manage the trailers in a distribution center.

Technique 2

In the passing determination device according to Technique 1, the processor is further configured to acquire a second captured image obtained by repeatedly capturing an image of the region including the passing determination position from the rear in the traveling direction of the trailer, and perform processing of detecting the trailer from the second captured image, when the trailer is detected from the first captured image captured within the first time period from the first time at which the trailer is detected from the first captured image, if the trailer is not detected from the second captured image captured at a time later than the first time, the trailer detected from the first captured image captured at the first time does not pass through the passing determination position, and the processor is further configured to determine that the trailer detected from the first captured image captured at the first time passes through the passing determination position if the trailer is detected from the second captured image captured at a time later than the first time.

Accordingly, the passing determination device according to the present embodiment can prevent a plurality of trailers that travel in close proximity from being erroneously determined as one trailer. The passing determination device can reduce the number of times of erroneous determination and improve a determination accuracy by distinguishing the trailers using two cameras.

Technique 3

In the passing determination device according to Technique 1 or 2, the processor is configured to determine that the trailer detected from the first captured image captured at a time prior to the second time, which is an imaging time of the second captured image from which the trailer is detected, is different from the trailer detected from the first captured image captured after the second time.

Accordingly, the passing determination device according to the present embodiment can separate the trailers that travel in close proximity to a trailer as a passing determination target from the trailer as the passing determination target with high accuracy.

Technique 4

In the passing determination device according to any one of Techniques 1 to 3, the processor is configured to acquire a second captured image obtained by repeatedly capturing an image of the region including the passing determination position from the rear in the traveling direction of the trailer, perform processing of detecting the trailer from the second captured image, determine that, when the trailer is not detected from the first captured image captured within the first time period from the first time, if the trailer is detected from the second captured image captured within the second time period from the first time, the trailer detected at the first time from the first captured image and the trailer detected from the second captured image are the same trailer, and determine that, if the trailer is not detected from the second captured image captured within the second time period from the first time, the trailer detected from the first captured image or the second captured image after the second time period elapses is different from the trailer detected from the first captured image at the first time and the trailer detected from the second captured image.

Accordingly, the passing determination device according to the present embodiment can determine whether the trailers detected in the first captured image and the second captured image are the same trailer or different trailers in a case in which there is a trailer that travels in close proximity to the trailer as the passing determination target. Accordingly, the passing determination device can manage which trailer appearing in the captured image is the trailer determined to pass. That is, the passing determination device can store and manage the image of the trailer determined to pass to the database without being mixed with the images of the different trailers. For example, it is possible to more accurately detect a trailer ID even if the ID is written at a position at which only one of the images can be seen, by detecting the trailer ID from the plurality of images including the trailer determined to be the same. In particular, the first captured image captured by the front camera and the second captured image captured by the rear camera have different angles, and thus even if the ID cannot be detected from one of the captured images, the ID can be detected from the other captured image. The passing determination device can manage images captured by the front camera and the rear camera and including the same trailer as captured images including the same trailer, and thus when it is desired to confirm the images including the same trailer, images captured at various viewpoints can be collectively extracted, and the convenience for a user can be improved.

Technique 5

The passing determination device according to any one of Techniques 1 to 4 further includes: a database, in which the processor is configured to detect identification information of the trailer, and store the identification information of the trailer determined to pass through the passing determination position in the database.

Accordingly, the passing determination device according to the present embodiment can construct a database that stores information on the trailers present in the distribution center 100.

Technique 6

A passing determination device according to the present embodiment includes: a processor configured to acquire a captured image at a predetermined time interval from a camera configured to capture an image of a trailer, set a coordinate in a direction corresponding to a traveling direction of the trailer in the captured image, calculate a first coordinate of the trailer, and determine that the trailer passes through a passing determination position when an amount of change between the calculated first coordinate and a second coordinate of the trailer calculated from the captured image acquired immediately before is equal to or greater than a predetermined threshold value.

Accordingly, the passing determination device according to the present embodiment can distinguish the plurality of trailers that travel in close proximity with high accuracy.

Technique 7

In the passing determination device according to Technique 6, the processor is configured to determine that, when detecting a tractor between the first coordinate and the second coordinate, the trailer passes through the passing determination position.

Accordingly, the passing determination device according to the present embodiment can also prevent the trailer passing determination from being erroneously performed by performing the passing determination processing with the detection of the tractor when the trailer is erroneously detected at a position at which an X coordinate increases.

Although the embodiments have been described above with reference to the accompanying drawings, the present disclosure is not limited to such embodiments. It is apparent to those skilled in the art that various modifications, corrections, substitutions, additions, deletions, and equivalents can be conceived within the scope described in the claims, and it is understood that such modifications, corrections, substitutions, additions, deletions, and equivalents also fall within the technical scope of the present disclosure. In addition, components in the embodiments described above may be combined freely in a range without departing from the gist of the invention.

INDUSTRIAL APPLICABILITY

The techniques of the present disclosure are useful as a passing determination device, a passing determination system, and a passing determination method that distinguish trailers that travel in close proximity with high accuracy.

CROSS-REFERENCE TO RELATED APPLICATIONS

This application is based on and claims priority under 35 USC 119 from Japanese Patent Application No. 2023-172896 filed on Oct. 4, 2023, the entire content of which is incorporated herein by reference.

What is claimed is:

1. A passing determination device comprising:
a processor that
acquires a captured image at a predetermined time interval from a camera configured to capture an image of a trailer,
sets a coordinate in a direction corresponding to a traveling direction of the trailer in the captured image,
calculates a first coordinate of the trailer, and
determines that the trailer passes through a passing determination position when an amount of change between the calculated first coordinate and a second coordinate of the trailer calculated from the captured image acquired immediately before is equal to or greater than a predetermined threshold value.

2. The passing determination device according to claim 1, wherein:
the processor
acquires a first captured image obtained by repeatedly capturing an image of a region including a passing determination position of the trailer from a front of the trailer in a traveling direction of the trailer,
detects the trailer from the first captured image, and
determines that the trailer detected from the first captured image captured at a first time passes through the passing determination position when the trailer is detected from the first captured image captured at the first time and the trailer is not detected from the first captured image captured within a first time period from the first time.

3. The passing determination device according to claim 2, wherein
the processor further
acquires a second captured image obtained by repeatedly capturing an image of the region including the passing determination position from a rear of the trailer in the traveling direction of the trailer, and
detects the trailer from the second captured image,
in a case that the trailer is detected from the first captured image captured within the first time period from the first time at which the trailer is detected from the first captured image,
when the trailer is not detected from the second captured image captured at a time later than the first time, the processor determines that the trailer detected from the first captured image captured at the first time does not pass through the passing determination position, and
when the trailer is detected from the second captured image captured at the time later than the first time, the processor determines that the trailer detected from the first captured image captured at the first time passes through the passing determination position.

4. The passing determination device according to claim 3, wherein
the processor determines that the trailer detected from the first captured image captured at a time prior to a second time, which is an imaging time of the second captured image from which the trailer is detected, is different from the trailer detected from the first captured image captured after the second time.

5. The passing determination device according to claim 2, wherein
the processor
acquires a second captured image obtained by repeatedly capturing an image of the region including the passing determination position from the rear in the traveling direction of the trailer, and
detects the trailer from the second captured image,
in a case that the trailer is not detected from the first captured image captured within the first time period from the first time,
when the trailer is detected from the second captured image captured within a second time period from the first time, the processor determines that the trailer detected at the first time from the first captured image and the trailer detected from the second captured image are the same trailer, and
when the trailer is not detected from the second captured image captured within the second time period from the first time, the processor determines that the trailer detected from the first captured image or the second captured image after the second time period elapses is different from the trailer detected from the first captured image at the first time and the trailer detected from the second captured image.

6. The passing determination device according to claim 2, further comprising:
a database, wherein
the processor
detects identification information of the trailer, and
stores the identification information of the trailer determined to pass through the passing determination position in the database.

7. The passing determination device according to claim 1, wherein
the processor determines that the trailer passes through the passing determination position when a tractor between the first coordinate and the second coordinate is detected.

8. A passing determination system, comprising:
a camera that captures an image of a trailer; and
a processor that
captures a captured image from the camera,
acquires the captured image at a predetermined time interval from the camera,
sets a coordinate in a direction corresponding to a traveling direction of the trailer in the captured image,
calculates a first coordinate of the trailer, and
determines that the trailer passes through a passing determination position when an amount of change between the calculated first coordinate and a second coordinate of the trailer calculated from the captured image acquired immediately before is equal to or greater than a predetermined threshold value.

9. The passing determination system according to claim 8, further comprising:
a front camera that repeatedly captures an image of a region including a passing determination position of the trailer from the front in a traveling direction of the trailer; and
a processor that acquires a first captured image from the front camera, wherein the processor detects the trailer from the first captured image, and determines that the trailer detected from the first captured image captured at a first time passes through the passing determination position when the trailer is detected from the first captured image captured at the first time and the trailer is not detected from the first captured image captured within a first time period from the first time.

10. A passing determination method, comprising:

acquiring a captured image at a predetermined time interval from a camera that captures an image of a trailer;

setting a coordinate in a direction corresponding to a traveling direction of the trailer in the captured image;

calculating a first coordinate of the trailer; and determining that the trailer passes through a passing determination position when an amount of change between the calculated first coordinate and a second coordinate of the trailer calculated from the captured image acquired immediately before is equal to or greater than a predetermined threshold value.

11. The passing determination method according to claim 10, further comprising:

acquiring a first captured image obtained by repeatedly capturing an image of a region including a passing determination position of a trailer from the front in a traveling direction of the trailer;

detecting the trailer from the first captured image; and determining that the trailer detected from the first captured image captured at a first time passes through the passing determination position when the trailer is detected from the first captured image captured at the first time and the trailer is not detected from the first captured image captured within a first time period from the first time.

* * * * *